(12) United States Patent
Geng et al.

(10) Patent No.: US 12,399,348 B2
(45) Date of Patent: Aug. 26, 2025

(54) CAMERA LENS GROUP

(71) Applicant: Zhejiang Sunny Optics Co., Ltd, Yuyao (CN)

(72) Inventors: Xiaoting Geng, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 842 days.

(21) Appl. No.: 17/193,465

(22) Filed: Mar. 5, 2021

(65) Prior Publication Data

US 2021/0389573 A1 Dec. 16, 2021

(30) Foreign Application Priority Data

Jun. 10, 2020 (CN) .......................... 202010522818.5

(51) Int. Cl.
*G02B 13/18* (2006.01)
*G02B 9/60* (2006.01)
*G02B 13/00* (2006.01)
*G02B 27/00* (2006.01)

(52) U.S. Cl.
CPC ........... *G02B 13/0045* (2013.01); *G02B 9/60* (2013.01); *G02B 27/0025* (2013.01)

(58) Field of Classification Search
CPC ........ G02B 9/60; G02B 13/0045; G02B 9/00; G02B 13/00; G02B 13/001; G02B 13/0015; G02B 13/002; G02B 13/008; G02B 13/14; G02B 13/143; G02B 13/146; G02B 13/18; G02B 27/0025
USPC ......... 359/714, 746, 753–754, 763–764, 767
See application file for complete search history.

(56) References Cited

U.S. PATENT DOCUMENTS

| 8,233,224 | B2* | 7/2012 | Chen ........................ G02B 9/60 |
| | | | 359/764 |
| 8,482,863 | B2* | 7/2013 | Tsai ........................ G02B 13/18 |
| | | | 359/767 |
| 2010/0253829 | A1* | 10/2010 | Shinohara .......... G02B 13/0045 |
| | | | 359/764 |
| 2011/0013069 | A1* | 1/2011 | Chen ........................ G02B 9/60 |
| | | | 348/335 |
| 2011/0043930 | A1 | 2/2011 | Kwon |
| | | | (Continued) |

FOREIGN PATENT DOCUMENTS

CN 101995641 A 3/2011
CN 102317834 A 1/2012
(Continued)

OTHER PUBLICATIONS

First Examination Report for Application No. 202114011155, dated Feb. 2, 2022, 4 pages.

*Primary Examiner* — Thong Q Nguyen
(74) *Attorney, Agent, or Firm* — Barnes & Thornburg LLP

(57) ABSTRACT

The present disclosure discloses a camera lens group including, sequentially from an object side to an image side along an optical axis, a stop; a first lens having positive refractive power and a convex object-side surface; a second lens having refractive power; a third lens having refractive power, a convex object-side surface and a concave image-side surface; a fourth lens having positive refractive power, a concave object-side surface and a convex image-side surface; and a fifth lens having negative refractive power, a convex object-side surface and a concave image-side surface.

14 Claims, 14 Drawing Sheets

(56) References Cited

U.S. PATENT DOCUMENTS

| | | | |
|---|---|---|---|
| 2012/0069455 A1* | 3/2012 | Lin | G02B 13/0045 359/714 |
| 2012/0154929 A1* | 6/2012 | Tsai | G02B 9/60 359/714 |
| 2013/0002920 A1 | 1/2013 | Sano | |
| 2013/0016261 A1* | 1/2013 | Tanaka | G02B 13/0045 359/708 |
| 2013/0279023 A1 | 10/2013 | Chen | |
| 2014/0063620 A1 | 3/2014 | Jung et al. | |
| 2014/0293445 A1* | 10/2014 | Yoneyama | G02B 13/0045 359/714 |
| 2014/0340766 A1* | 11/2014 | Hsu | G02B 13/0045 359/714 |
| 2015/0103225 A1* | 4/2015 | Hsu | G02B 9/60 348/335 |
| 2015/0253537 A1* | 9/2015 | Ye | G02B 9/60 348/374 |
| 2018/0074293 A1* | 3/2018 | Hsu | G02B 5/208 |

FOREIGN PATENT DOCUMENTS

| | | |
|---|---|---|
| CN | 102540423 A | 7/2012 |
| CN | 102566016 A | 7/2012 |
| CN | 102566018 A | 7/2012 |
| CN | 102681142 A | 9/2012 |
| CN | 102955223 A | 3/2013 |
| CN | 102959448 A | 3/2013 |
| CN | 102959449 A | 3/2013 |
| CN | 103048774 A | 4/2013 |
| CN | 103389568 A | 11/2013 |
| CN | 103472568 A | 12/2013 |
| CN | 103676095 A | 3/2014 |
| CN | 103869453 A | 6/2014 |
| CN | 104238080 A | 12/2014 |
| CN | 104914558 A | 9/2015 |
| CN | 105866933 A | 8/2016 |
| CN | 109960010 A | 7/2019 |
| CN | 110261994 A | 9/2019 |
| CN | 110376708 A | 10/2019 |
| CN | 110596865 A | 12/2019 |
| CN | 110727083 A | 1/2020 |
| CN | 111221106 A | 6/2020 |
| CN | 111239971 A | 6/2020 |
| CN | 210720853 U | 6/2020 |
| CN | 2020-109491 * | 7/2020 |
| CN | 211528805 U | 9/2020 |
| CN | 211554456 U | 9/2020 |
| CN | 211577551 U | 9/2020 |
| CN | 211786312 U | 10/2020 |
| CN | 211786341 U | 10/2020 |
| CN | 212905663 U | 4/2021 |
| JP | 2012208148 A | 10/2012 |
| KR | 20120094729 A | 8/2012 |
| KR | 101552594 B1 | 9/2015 |
| KR | 20160117998 A | 10/2016 |
| KR | 20160130972 A | 11/2016 |
| TW | I421557 B | 1/2014 |
| TW | 201409110 A | 3/2014 |
| TW | 201939085 A | 10/2019 |
| TW | I674450 B | 10/2019 |
| TW | 202016601 A | 5/2020 |
| WO | 2013058111 A1 | 4/2013 |

* cited by examiner

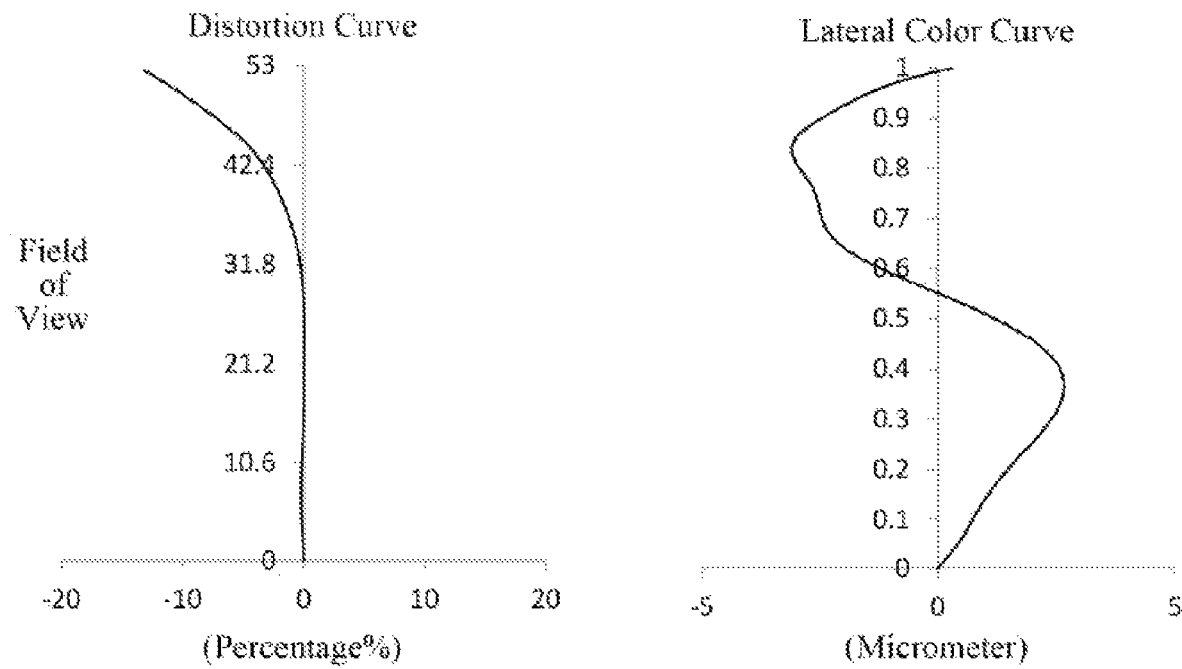
Fig. 14C
Fig. 14D
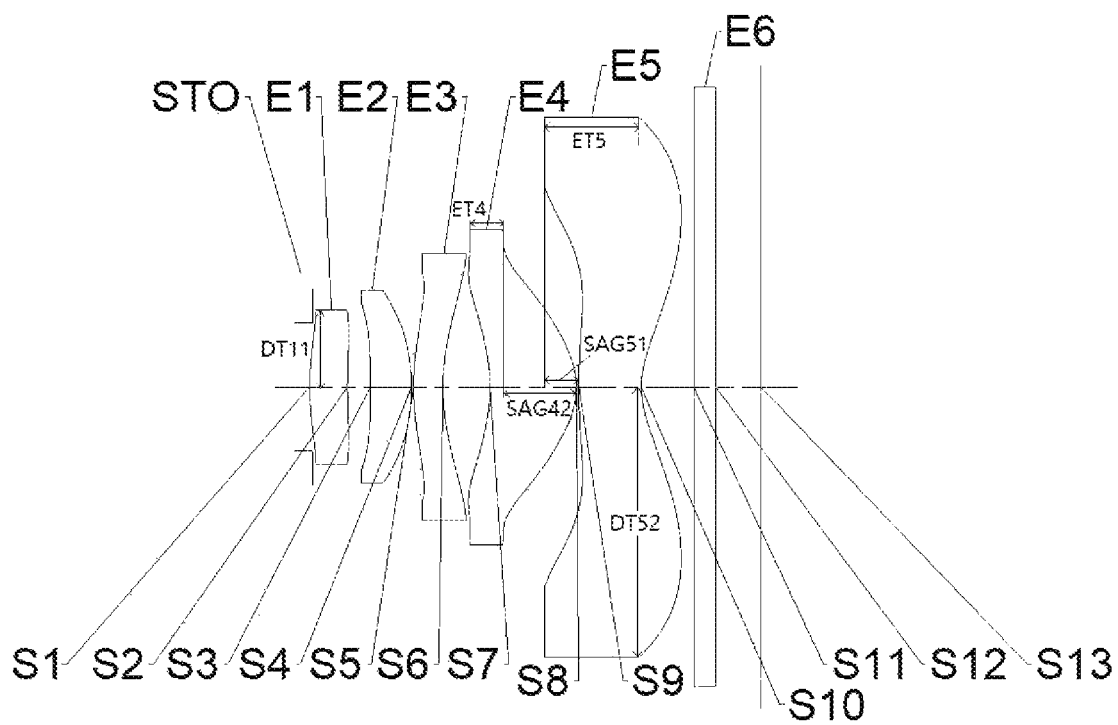
Fig. 15

CAMERA LENS GROUP

CROSS-REFERENCE TO RELATED APPLICATION

This application claims benefit of priority to Chinese Patent Application No. 202010522818.5 filed on Jun. 10, 2020 before the China National Intellectual Property Administration, the entire disclosure of which is incorporated herein by reference in its entity.

TECHNICAL FIELD

The present disclosure relates to the field of optical elements, and specifically, relates to a camera lens group.

BACKGROUND

With the continuous improvement of related technologies of portable electronic devices, such as smart phones, the trend of using portable electronic devices, such as smart phones, to take pictures instead of traditional cameras has become more and more obvious. At present, most of the mainstream models of portable electronic devices, such as smart phones, on the market are mainly full-screen models. The screen ratio of portable electronic devices, such as smart phones, is getting higher and higher, which will make the front cameras suitable for traditional mobile phones and other electronic devices no longer applicable.

Under this trend, lens assemblies with small front end have won the favor of developers of portable electronic devices, such as smartphones, with their extremely small front end size. However, the traditional center-mounted wide-angle lens assembly cannot achieve the characteristics of extremely small front end. How to make the camera lens group have an ultra-small front end on the basis of achieving a wide angle is one of the problems that many lens assembly designers need to solve urgently. The camera lens group with ultra-small front end and wide angle is more suitable for portable electronic devices, such as full-screen smartphones.

SUMMARY

The present disclosure provides a camera lens group which includes, sequentially from an object side to an image side along an optical axis, a stop; a first lens having positive refractive power and a convex object-side surface; a second lens having refractive power; a third lens having refractive power, a convex object-side surface and a concave image-side surface; a fourth lens having positive refractive power, a concave object-side surface and a convex image-side surface; and a fifth lens having negative refractive power, a convex object-side surface and a concave image-side surface. Half of a maximum field-of-view Semi-FOV of the camera lens group and a total effective focal length f of the camera lens group may satisfy: $2.00 \text{ mm} < \tan^2(\text{Semi-FOV})*f < 5.00 \text{ mm}$. A distance SAG42 along the optical axis from an intersection of the image-side surface of the fourth lens and the optical axis to a vertex of an effective radius of the image-side surface of the fourth lens and a distance SAG51 along the optical axis from an intersection of the object-side surface of the fifth lens and the optical axis to a vertex of an effective radius of the object-side surface of the fifth lens may satisfy: $1.00 < (SAG42+SAG51)/(SAG42-SAG51) < 3.50$.

In one embodiment, at least one of the object-side surface of the first lens to the image-side surface of the fifth lens is aspheric.

In one embodiment, a maximum effective radius DT11 of the object-side surface of the first lens and a maximum effective radius DT52 of the image-side surface of the fifth lens may satisfy: $3.00 < DT52/DT11 < 5.00$.

In one embodiment, a distance TTL along the optical axis from the object-side surface of the first lens to an imaging plane of the camera lens group and half of a diagonal length ImgH of an effective pixel area on the imaging plane of the camera lens group may satisfy: $TTL/ImgH < 1.55$.

In one embodiment, an effective focal length f1 of the first lens and a radius of curvature R1 of the object-side surface of the first lens may satisfy: $1.00 < f1/R1 < 6.00$.

In one embodiment, a radius of curvature R5 of the object-side surface of the third lens and a radius of curvature R10 of the image-side surface of the fifth lens may satisfy: $2.00 < R5/R10 < 6.00$.

In one embodiment, a center thickness CT4 of the fourth lens along the optical axis and a spaced interval T34 between the third lens and the fourth lens along the optical axis may satisfy: $1.00 < CT4/T34 < 4.00$.

In one embodiment, an edge thickness ET4 of the fourth lens and an edge thickness ET5 of the fifth lens may satisfy: $1.00 < (ET4+ET5)/(ET5-ET4) < 4.00$.

In one embodiment, a center thickness CT5 of the fifth lens along the optical axis and a center thickness CT3 of the third lens along the optical axis may satisfy: $0.50 < CT5/CT3 < 2.50$.

In one embodiment, the total effective focal length f of the camera lens group and an effective focal length f4 of the fourth lens may satisfy: $1.00 < f/f4 < 3.00$.

In another aspect, the present disclosure provides a camera lens group which includes, sequentially from an object side to an image side along an optical axis, a stop; a first lens having positive refractive power and a convex object-side surface; a second lens having refractive power; a third lens having refractive power, a convex object-side surface and a concave image-side surface; a fourth lens having positive refractive power, a concave object-side surface and a convex image-side surface; and a fifth lens having negative refractive power, a convex object-side surface and a concave image-side surface. Half of a maximum field-of-view Semi-FOV of the camera lens group and a total effective focal length f of the camera lens group may satisfy: $2.00 \text{ mm} < \tan^2(\text{Semi-FOV})*f < 5.00 \text{ mm}$. An edge thickness ET4 of the fourth lens and an edge thickness ET5 of the fifth lens may satisfy: $1.00 < (ET4+ET5)/(ET5-ET4) < 4.00$.

The present disclosure employs a plurality of (for example, five) lenses, and the above camera lens group has at least one beneficial effect, such as miniaturization, wide-angle, ultra-small front end, and high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting embodiments with reference to the accompanying drawings:

FIGS. 14A to 14D illustrate longitudinal aberration curves, astigmatic curves, a distortion curve, and a lateral color curve of the camera lens group of the example 7, respectively;

FIG. 15 illustrates a schematic structural view of a camera lens group according to example 8 of the present disclosure;

DETAILED DESCRIPTION OF EMBODIMENTS

Figure 1:
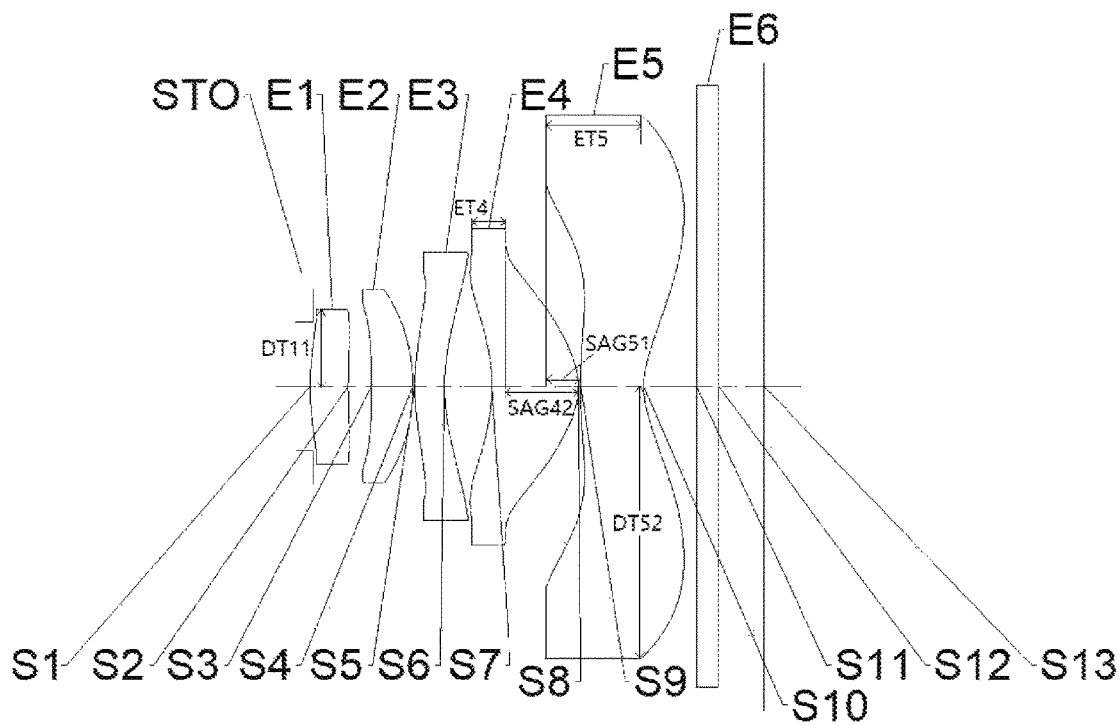
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include five lenses having refractive power, which are a first lens, a second lens, a third lens, a fourth lens and a fifth lens. The five lenses are arranged sequentially from an object side to an image side along an optical axis. Among the first lens to the fifth lens, there may be a spaced interval between each two adjacent lenses.

In an exemplary embodiment, the first lens may have positive refractive power, and an object-side surface thereof may be convex; the second lens has positive or negative refractive power; the third lens has positive or negative refractive power, an object-side surface thereof may be convex, and an image-side surface thereof may be concave; the fourth lens may have positive refractive power, an object-side surface thereof may be concave, and an image-side surface thereof may be convex; and the fifth lens may have negative refractive power, an object-side surface thereof may be convex, and an image-side surface thereof may be concave.

When cooperates the first lens having positive refractive power with the fourth lens having positive refractive power and the fifth lens having negative refractive power, the camera lens group may maintain better correction ability for chromatic aberration while expanding the maximum field-of-view of the camera lens group, thereby having a better image quality. By designing the object-side surface of the first lens as a convex surface, it may be beneficial to reduce the sensitivity of the camera lens group, thereby theoretically improving the mass production yield of the camera lens group as much as possible. By designing the object-side surface of the third lens as a convex surface and the image-side surface of the third lens as a concave surface, and cooperating with the concave-convex shape of the fourth lens, it is beneficial to reduce the risk of ghosting caused by the reflection between the third lens and the fourth lens and the internal reflection of the fourth lens as much as possible without reducing the image quality of the camera lens group. By designing the fifth lens as a convex-concave shape lens, it is beneficial to improve the image quality in the center imaging area, so that the camera lens group has a better image quality.

In an exemplary embodiment, the camera lens group according to the present disclosure may satisfy: 2.00 mm<$\tan^2$(Semi-FOV)*f<5.00 mm, where Semi-FOV is half of a maximum field-of-view of the camera lens group, and f is a total effective focal length of the camera lens group. More specifically, Semi-FOV and f may further satisfy: 2.70 mm<$\tan^2$(Semi-FOV)*f<4.30 mm. When 2.00 mm<$\tan^2$(Semi-FOV)*f<5.00 mm is satisfied, the field-of-view of the camera lens group may be increased, and the image height of the image may be controlled within a reasonable range, so that the lens assembly may have better imaging capabilities.

In an exemplary embodiment, the camera lens group according to the present disclosure may satisfy: 3.00<DT52/DT11<5.00, where DT11 is a maximum effective radius of the object-side surface of the first lens, and DT52 is a maximum effective radius of the image-side surface of the fifth lens. More specifically, DT52 and DT11 may further satisfy: 3.20<DT52/DT11<4.80. Satisfying 3.00<DT52/DT11<5.00 helps to the design of the depth of the lens barrel, making the lens assembly more suitable for the front camera.

In an exemplary embodiment, the camera lens group according to the present disclosure may satisfy: TTL/ImgH<1.55, where TTL is a distance along the optical axis from the object-side surface of the first lens to an imaging plane of the camera lens group, and ImgH is half of a diagonal length of an effective pixel area on the imaging plane of the camera lens group. Satisfying TTL/ImgH<1.55 may avoid the problem of the overall size of the camera lens group being too long due to the excessive thickness of the first lens while ensuring the basic imaging height, which is beneficial to maintain the ultra-small characteristics of the camera lens group.

In an exemplary embodiment, the camera lens group according to the present disclosure may satisfy: 1.00<f1/R1<6.00, where f1 is an effective focal length of the first lens, and R1 is a radius of curvature of the object-side surface of the first lens. More specifically, f1 and R1 may further satisfy: 1.30<f1/R1<5.80. Satisfying 1.00<f1/R1<6.00 may increase the field-of-view of the camera lens group while avoiding the risk of the first lens being too sensitive and not conducive to processing due to too small f1 or too large R1.

In an exemplary embodiment, the camera lens group according to the present disclosure may satisfy: 2.00<R5/R10<6.00, where R5 is a radius of curvature of the object-side surface of the third lens, and R10 is a radius of curvature of the image-side surface of the fifth lens. More specifically, R5 and R10 may further satisfy: 2.20<R5/R10<6.00. When 2.00<R5/R10<6.00 is satisfied, the correction ability of the camera lens group for chromatic aberration and distortion may be guaranteed, and specifically, the image quality in the central area may be improved advantageously.

In an exemplary embodiment, the camera lens group according to the present disclosure may satisfy: 1.00<CT4/T34<4.00, where CT4 is a center thickness of the fourth lens along the optical axis, and T34 is a spaced interval between the third lens and the fourth lens along the optical axis. More specifically, CT4 and T34 may further satisfy: 1.30<CT4/T34<3.20. Satisfying 1.00<CT4/T34<4.00 is beneficial to reduce the risk of ghost images generated by the internal reflection of the fourth lens and the reflection between the fourth lens and the third lens, and thus the image quality of the camera lens group is advantageously improved.

In an exemplary embodiment, the camera lens group according to the present disclosure may satisfy: 1.00<(SAG42+SAG51)/(SAG42−SAG51)<3.50, where SAG42 is a distance along the optical axis from an intersection of the image-side surface of the fourth lens and the optical axis to a vertex of an effective radius of the image-side surface of the fourth lens, and SAG51 is a distance along the optical axis from an intersection of the object-side surface of the fifth lens and the optical axis to a vertex of an effective radius of the object-side surface of the fifth lens. More specifically, SAG42 and SAG51 may further satisfy: 1.30<(SAG42+SAG51)/(SAG42−SAG51)<3.10. When 1.00<(SAG42+SAG51)/(SAG42−SAG51)<3.50 is satisfied, it is beneficial to avoid the risk of low yield rate due to the large step difference between SAG42 and SAG51. At the same time, it is also beneficial to reduce the ghosting phenomenon caused by reflection between the object-side surface of the fifth lens and the image-side surface of the fourth lens.

In an exemplary embodiment, the camera lens group according to the present disclosure may satisfy: 1.00<(ET4+ET5)/(ET5−ET4)<4.00, where ET4 is an edge thickness of the fourth lens, and ET5 is an edge thickness of the fifth lens. More specifically, ET4 and ET5 may further satisfy: 1.80<(ET4+ET5)/(ET5−ET4)<3.50. When 1.00<(ET4+ET5)/(ET5−ET4)<4.00 is satisfied, the problems, such as difficulty in mass production, due to the thin edge thicknesses of the fourth lens and the fifth lens may be avoided, and the image quality and the relative illumination at the edge field-of-view may be improved by adjusting the edge thicknesses of the fourth and fifth lens.

In an exemplary embodiment, the camera lens group according to the present disclosure may satisfy: 0.50<CT5/CT3<2.50, where CT5 is a center thickness of the fifth lens along the optical axis, and CT3 is a center thickness of the third lens along the optical axis. More specifically, CT5 and CT3 may further satisfy: 0.90<CT5/CT3<2.20. Satisfying 0.50<CT5/CT3<2.50 may avoid problems, such as difficulty in lens molding, due to the thin center thicknesses of the third lens and the fifth lens along the optical axis, and may also avoid the problem that the overall size of the lens assembly is too long due to the thick center thicknesses of the third lens and the fifth lens along the optical axis.

In an exemplary embodiment, the camera lens group according to the present disclosure may satisfy: 1.00<f/f4<3.00, where f is a total effective focal length of the camera lens group, and f4 is an effective focal length of the fourth lens. More specifically, f and f4 may further satisfy: 1.30<f/f4<2.40. Satisfying 1.00<f/f4<3.00 is conducive to controlling the percentage of the effective focal length of the fourth lens in the total effective focal length. In this way, the refractive power of the camera lens group may be more reasonably distributed, and the sensitivity of the overall camera lens group may be reduced, thereby the processing yield is improved.

In an exemplary embodiment, the camera lens group according to the present disclosure further includes a stop disposed between the object side and the first lens. Optionally, the above camera lens group may further include an optical filter for correcting the color deviation and/or a protective glass for protecting the photosensitive element located on an imaging plane.

The camera lens group according to the above embodiments of the present disclosure may employ a plurality of lenses, such as five lenses as described above. By properly configuring the refractive power of each lens, the surface shape, the center thickness of each lens, and spaced intervals along the optical axis between the lenses, the size of the camera lens group may be effectively reduced, and the workability of the camera lens group may be improved, such that the camera lens group is more advantageous for production processing and may be applied to portable electronic products. The camera lens group configured as described above has the characteristics of ultra-small front end, ultra-large field-of-view, and good image quality, so as to well satisfy the shooting needs of various portable electronic products in different scenarios.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking five lenses as an example, the camera lens group is not limited to include five lenses. The camera lens group may also include other numbers of lenses if desired.

Some specific examples of a camera lens group applicable to the above embodiment will be further described below with reference to the accompanying drawings.

Example 1

A camera lens group according to example 1 of the present disclosure is described below with reference to FIG. 1 to FIG. 2D. FIG. 1 shows a schematic structural view of the camera lens group according to example 1 of the present disclosure.

As shown in FIG. 1, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 1 is a table illustrating basic parameters of the camera lens group of example 1, wherein the units for the radius of curvature, the thickness/distance and the focal length are millimeter (mm).

TABLE 1

| Surface number | Surface type | Radius of curvature | Thickness/Distance | Material Refractive index | Material Abbe number | Focal length | Conic coefficient |
|---|---|---|---|---|---|---|---|
| OBJ | | Infinite | Infinite | | | | |
| STO | | Infinite | −0.0260 | | | | |
| S1 | Aspheric | 2.6902 | 0.3601 | 1.55 | 56.1 | 9.56 | −11.8079 |
| S2 | Aspheric | 5.2867 | 0.2206 | | | | 45.8857 |
| S3 | Aspheric | −10.6685 | 0.3908 | 1.55 | 56.1 | 4.45 | 65.0327 |
| S4 | Aspheric | −2.0031 | 0.0200 | | | | −1.4454 |
| S5 | Aspheric | 2.3709 | 0.2798 | 1.68 | 19.2 | −30.39 | −9.4155 |
| S6 | Aspheric | 2.0248 | 0.4488 | | | | −3.2296 |
| S7 | Aspheric | −1.8517 | 0.8285 | 1.55 | 56.1 | 1.44 | −3.8951 |

TABLE 1-continued

| Surface number | Surface type | Radius of curvature | Thickness/ Distance | Material Refractive index | Abbe number | Focal length | Conic coefficient |
|---|---|---|---|---|---|---|---|
| S8 | Aspheric | −0.6406 | 0.0203 | | | | −1.7703 |
| S9 | Aspheric | 10.3343 | 0.5954 | 1.62 | 23.5 | −1.37 | 1.9893 |
| S10 | Aspheric | 0.7927 | 0.5008 | | | | −6.6153 |
| S11 | | Infinite | 0.2100 | 1.52 | 64.2 | | |
| S12 | | Infinite | 0.4308 | | | | |
| S13 | | Infinite | | | | | |

In this example, a total effective focal length f of the camera lens group is 2.75 mm, a total length TTL of the camera lens group (that is, a distance along the optical axis from the object-side surface S1 of the first lens E1 to the imaging plane S13 of the camera lens group) is 4.31 mm, half of a diagonal length ImgH of an effective pixel area on the imaging plane S13 of the camera lens group is 3.07 mm, half of a maximum field-of-view Semi-FOV of the camera lens group is 50.8°, and an aperture value Fno of the camera lens group is 2.25.

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 2

| Surface number | A4 | A6 | A8 | A10 | A12 |
|---|---|---|---|---|---|
| S1 | 1.2116E−02 | −6.4255E−01 | 5.7786E+00 | −3.4530E+01 | 1.1270E+02 |
| S2 | −1.5618E−01 | −2.3276E−01 | −1.7805E+00 | 3.1810E−01 | −5.0225E−01 |
| S3 | −1.1861E−01 | 1.1341E+00 | −1.6243E+01 | 1.1012E+02 | −4.0606E+02 |
| S4 | −1.0229E−01 | −5.3428E−01 | 6.1981E+00 | −3.3985E+01 | 1.0318E+02 |
| S5 | −6.4120E−02 | −1.3045E−01 | 1.0982E+00 | −3.7711E+00 | 7.3820E+00 |
| S6 | −3.0425E−02 | −1.3183E−01 | 4.3269E−01 | −7.2637E−01 | 6.8304E−01 |
| S7 | −1.6746E−01 | 1.6379E+00 | −8.9337E+00 | 3.2811E+01 | −8.4917E+01 |
| S8 | 7.3032E−01 | −3.1730E+00 | 1.0425E+01 | −2.6322E+01 | 4.8337E+01 |
| S9 | 1.9758E−01 | −5.4287E−01 | 5.2132E−01 | −4.8052E−02 | −6.5167E−01 |
| S10 | 1.3833E−02 | −7.0650E−02 | 3.6308E−02 | 1.9569E−02 | −4.2367E−02 |

| Surface number | A14 | A16 | A18 | A20 |
|---|---|---|---|---|
| S1 | −1.8945E+02 | 1.2800E+02 | 0.0000E+00 | 0.0000E+00 |
| S2 | 0.0000E+00 | 0.0000E+00 | 0.0000E+00 | 0.0000E+00 |
| S3 | 5.5610E+02 | 1.6792E+03 | −9.8591E+03 | 2.2140E+04 |
| S4 | −1.4720E+02 | −8.6863E+01 | 7.9140E+02 | −1.5418E+03 |
| S5 | −9.0079E+00 | 6.8472E+00 | −2.9915E+00 | 5.7220E−01 |
| S6 | −3.3925E−01 | 6.5987E−02 | 5.9160E−03 | −2.7754E−03 |
| S7 | 1.5775E+02 | −2.1063E+02 | 2.0140E+02 | −1.3640E+02 |
| S8 | −6.3701E+01 | 6.0275E+01 | −4.0849E+01 | 1.9609E+01 |
| S9 | 1.0974E+00 | −1.0257E+00 | 6.3659E−01 | −2.7453E−01 |
| S10 | 3.2337E−02 | −1.5156E−02 | 4.8471E−03 | −1.0937E−03 |

Figure 2A:
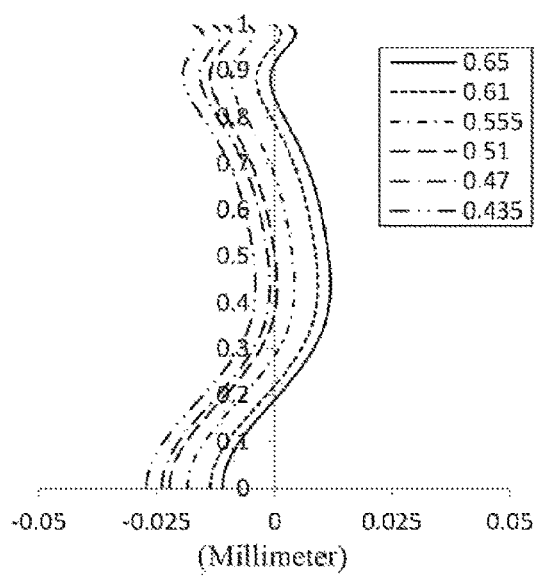
FIGS. 2A to 2D illustrate longitudinal aberration curves, astigmatic curves, a distortion curve, and a lateral color curve of the camera lens group of the example 1, respectively.
Figure 2B:
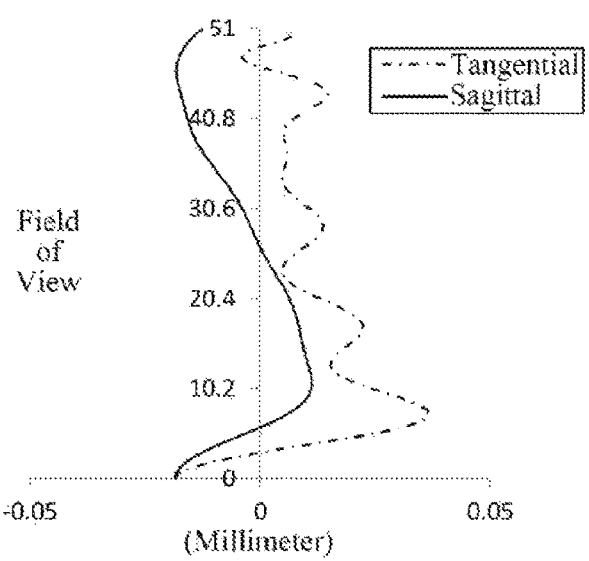
Figures 2C, 2D:
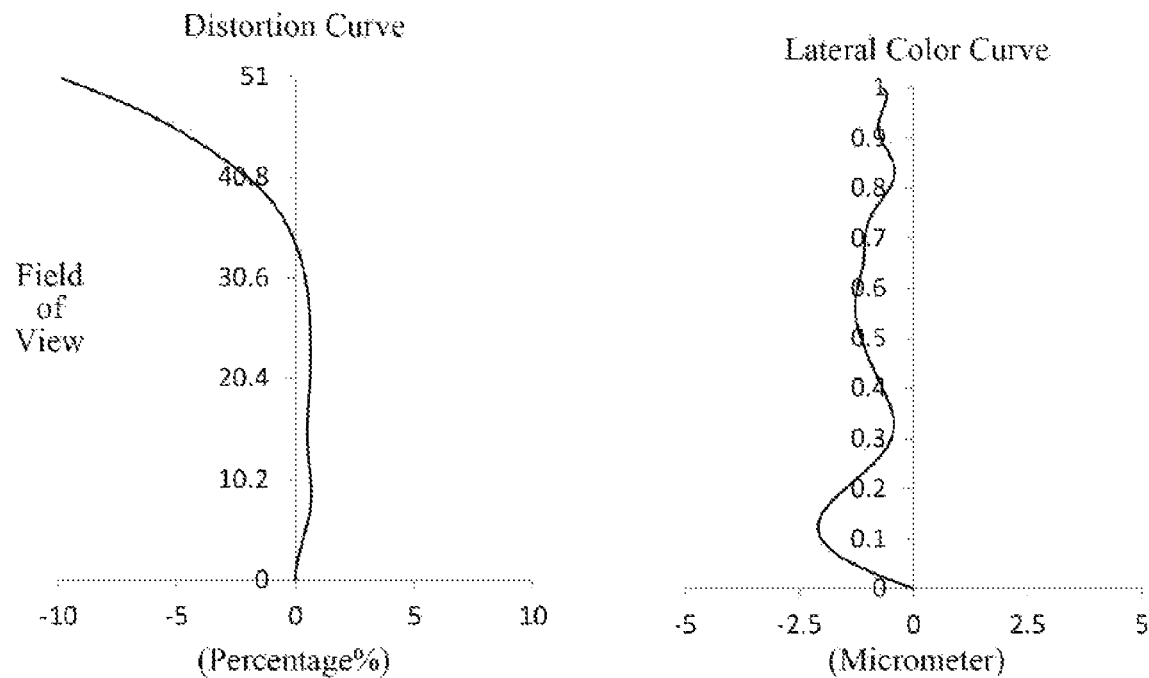

FIG. 2A illustrates the longitudinal aberration curves of the camera lens group according to example 1, representing the deviations of focal points converged by light of different wavelengths after passing through the lens assembly. FIG. 2B illustrates the astigmatic curves of the camera lens group according to example 1, representing the curvatures of a tangential plane and the curvatures of a sagittal plane. FIG. 2C illustrates a distortion curve of the camera lens group according to example 1, representing the amounts of distortion corresponding to different field-of-views. FIG. 2D illustrates a lateral color curve of the camera lens group according to example 1, representing the deviations of different image heights on an imaging plane after light passes through the lens assembly. It can be seen from FIG. 2A to FIG. 2D that the camera lens group provided in example 1 may achieve good image quality.

Example 2

Figure 3:
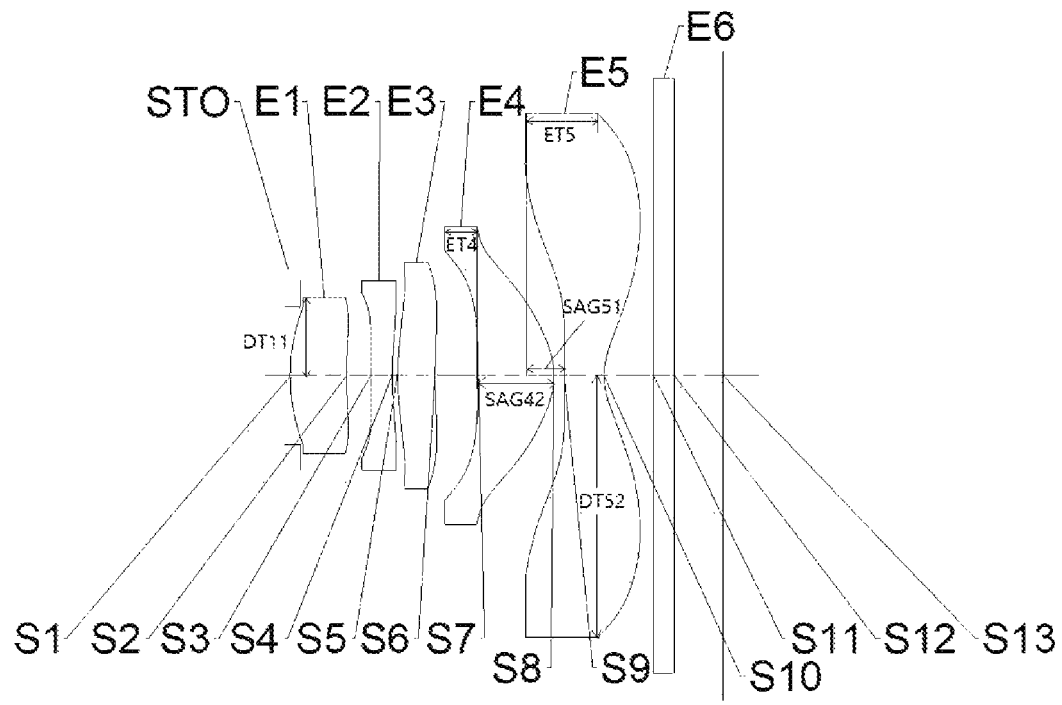
FIG. 3 illustrates a schematic structural view of a camera lens group according to example 2 of the present disclosure.

A camera lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the camera lens group according to example 2 of the present disclosure.

As shown in FIG. 3, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 3.11 mm, a total length TTL of the camera lens group is 4.37 mm, half of a diagonal length ImgH of an effective pixel area on the imaging plane S13 of the camera lens group is 3.27 mm, half of a maximum field-of-view Semi-FOV of the camera lens group is 46.1°, and an aperture value Fno of the camera lens group is 2.24.

Table 3 is a table illustrating basic parameters of the camera lens group of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Refractive index | Abbe number | Focal length | Conic coefficient |
|---|---|---|---|---|---|---|---|
| OBJ | | Infinite | Infinite | | | | |
| STO | | Infinite | −0.1018 | | | | |
| S1 | Aspheric | 1.8219 | 0.5700 | 1.55 | 56.1 | 4.85 | −3.6259 |
| S2 | Aspheric | 5.1939 | 0.2400 | | | | −88.6691 |
| S3 | Aspheric | 9.9153 | 0.2200 | 1.67 | 20.4 | −6.47 | −0.6749 |
| S4 | Aspheric | 2.9792 | 0.0526 | | | | −35.7741 |
| S5 | Aspheric | 2.2218 | 0.3793 | 1.55 | 56.1 | 6.92 | −1.1801 |
| S6 | Aspheric | 5.0646 | 0.4377 | | | | −21.9222 |
| S7 | Aspheric | −7.2275 | 0.7629 | 1.55 | 56.1 | 1.38 | 11.6728 |
| S8 | Aspheric | −0.7098 | 0.1023 | | | | −5.2796 |
| S9 | Aspheric | 11.4222 | 0.4000 | 1.54 | 55.9 | −1.28 | 16.6558 |
| S10 | Aspheric | 0.6413 | 0.5039 | | | | −4.8346 |
| S11 | | Infinite | 0.2100 | 1.52 | 64.2 | | |
| S12 | | Infinite | 0.4914 | | | | |
| S13 | | Infinite | | | | | |

TABLE 4

| Surface number | A4 | A6 | A8 | A10 | A12 |
|---|---|---|---|---|---|
| S1 | 3.1695E−02 | 5.2247E−01 | −6.4515E+00 | 4.1199E+01 | −1.5695E+02 |
| S2 | 5.5258E−03 | −7.8543E−01 | 5.8928E+00 | −3.5996E+01 | 1.3660E+02 |
| S3 | −1.5107E−01 | 4.8949E−02 | −1.8439E+00 | 9.0226E+00 | −2.9302E+01 |
| S4 | −1.7599E−01 | 2.9993E−01 | 1.0546E+00 | −9.2579E+00 | 2.8363E+01 |
| S5 | −4.7627E−01 | 9.3770E−01 | −5.9945E−01 | −2.5891E+00 | 9.0540E+00 |
| S6 | −1.3589E−01 | −6.2987E−02 | 4.9425E−01 | −1.0160E+00 | 1.0833E+00 |
| S7 | 3.0001E−02 | −2.6374E−01 | 3.3757E−01 | −1.0978E−01 | −6.0562E−01 |
| S8 | −3.9265E−01 | 1.0746E+00 | −2.5939E+00 | 4.0484E+00 | −4.0400E+00 |
| S9 | −1.1952E−01 | −1.2062E−01 | 1.2062E−01 | 1.0870E−01 | −2.5076E−01 |
| S10 | −1.1157E−01 | 4.6594E−02 | −1.1441E−02 | 5.4644E−03 | −6.6694E−03 |

| Surface number | A14 | A16 | A18 | A20 |
|---|---|---|---|---|
| S1 | 3.6030E+02 | −4.8344E+02 | 3.4185E+02 | −9.4647E+01 |
| S2 | −3.2507E+02 | 4.7102E+02 | −3.7989E+02 | 1.3104E+02 |
| S3 | 5.9343E+01 | −7.1639E+01 | 4.7712E+01 | −1.3188E+01 |
| S4 | −4.8606E+01 | 4.9473E+01 | −2.8017E+01 | 6.8138E+00 |
| S5 | −1.4435E+01 | 1.3069E+01 | −6.4565E+00 | 1.3455E+00 |
| S6 | −6.4105E−01 | 1.8101E−01 | −1.4069E−02 | 1.4288E−03 |
| S7 | 1.2836E+00 | −1.1774E+00 | 5.2418E−01 | −9.1189E−02 |
| S8 | 2.5615E+00 | −9.8709E−01 | 2.0955E−01 | −1.8758E−02 |
| S9 | 2.0397E−01 | −9.6226E−02 | 2.8981E−02 | −5.6653E−03 |
| S10 | 4.7905E−03 | −2.0012E−03 | 5.2295E−04 | −8.7114E−05 |

Figure 4A:
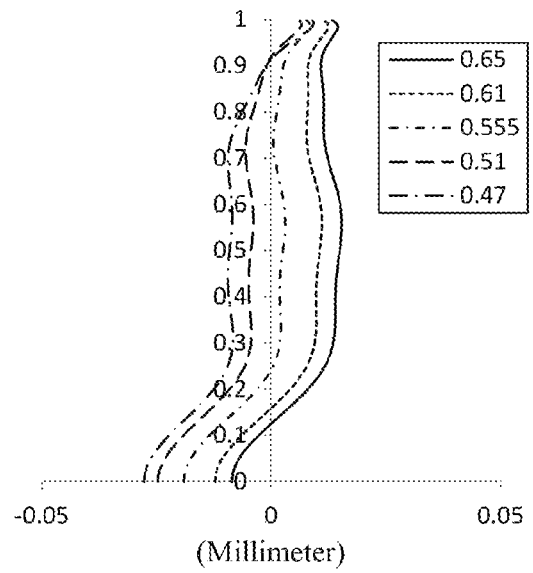
FIGS. 4A to 4D illustrate longitudinal aberration curves, astigmatic curves, a distortion curve, and a lateral color curve of the camera lens group of the example 2, respectively.
Figure 4B:
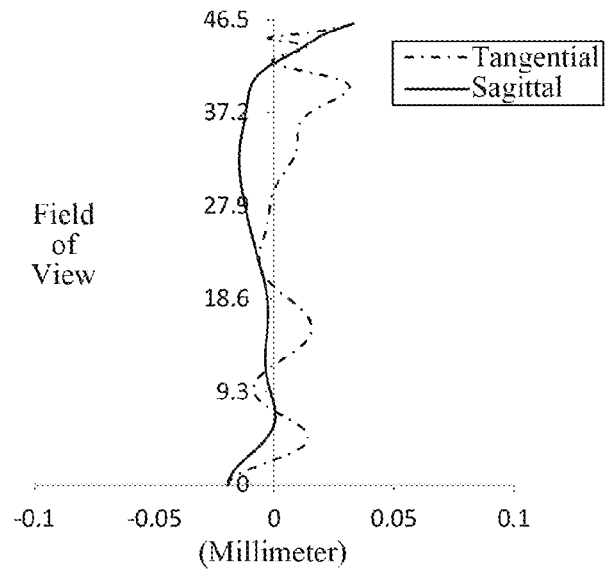
Figure 4C:
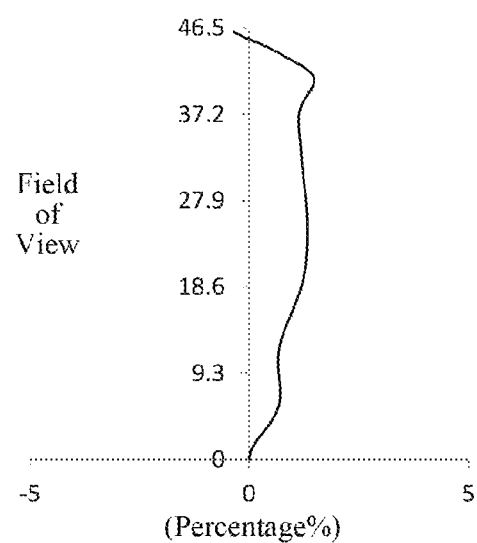
Figure 4D:
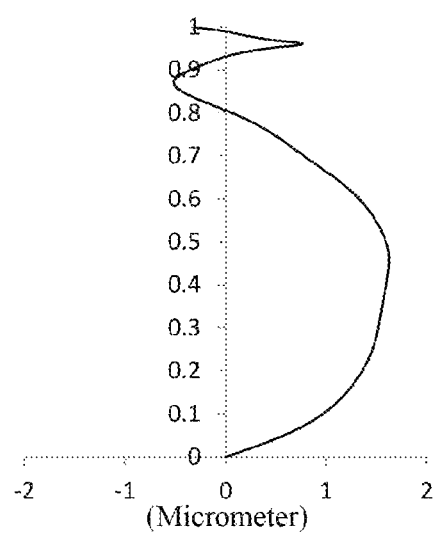

FIG. 4A illustrates the longitudinal aberration curves of the camera lens group according to example 2, representing the deviations of focal points converged by light of different wavelengths after passing through the lens assembly. FIG. 4B illustrates the astigmatic curves of the camera lens group according to example 2, representing the curvatures of a tangential plane and the curvatures of a sagittal plane. FIG. 4C illustrates a distortion curve of the camera lens group according to example 2, representing the amounts of distortion corresponding to different field-of-views. FIG. 4D illustrates a lateral color curve of the camera lens group according to example 2, representing the deviations of different image heights on an imaging plane after light passes through the lens assembly. It can be seen from FIG. 4A to FIG. 4D that the camera lens group provided in example 2 may achieve good image quality.

Example 3

Figure 5:
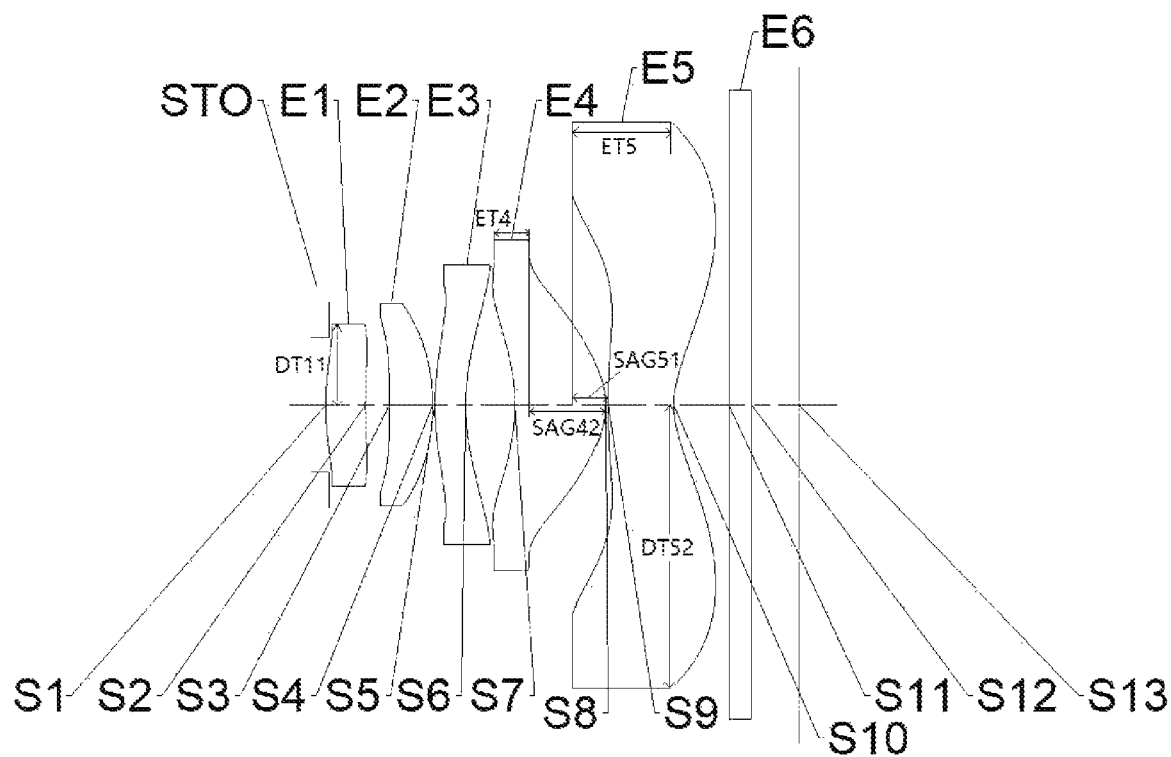
FIG. 5 illustrates a schematic structural view of a camera lens group according to example 3 of the present disclosure.

A camera lens group according to example 3 of the present disclosure is described below with reference to FIG. 5 to FIG. 6D. FIG. 5 shows a schematic structural view of the camera lens group according to example 3 of the present disclosure.

As shown in FIG. 5, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 2.67 mm, a total length TTL of the camera lens group is 3.96 mm, half of a diagonal length ImgH of an effective pixel area on the imaging plane S13 of the camera lens group is 2.57 mm, half of a maximum field-of-view Semi-FOV of the camera lens group is 46.0°, and an aperture value Fno of the camera lens group is 2.24.

Table 5 is a table illustrating basic parameters of the camera lens group of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | | Infinite | Infinite | | | | |
| STO | | Infinite | −0.0260 | | | | |
| S1 | Aspheric | 2.2484 | 0.3500 | 1.55 | 56.1 | 7.87 | −10.9991 |
| S2 | Aspheric | 4.4583 | 0.1710 | | | | 41.5002 |
| S3 | Aspheric | −17.9237 | 0.3413 | 1.67 | 20.4 | 3.27 | −99.0000 |
| S4 | Aspheric | −1.6347 | 0.0200 | | | | −3.3048 |
| S5 | Aspheric | 2.3290 | 0.2689 | 1.55 | 56.1 | −6.02 | −18.1918 |
| S6 | Aspheric | 1.4134 | 0.4109 | | | | −3.6000 |
| S7 | Aspheric | −2.2396 | 0.7251 | 1.55 | 56.1 | 1.46 | −3.3706 |
| S8 | Aspheric | −0.6774 | 0.0693 | | | | −1.6267 |
| S9 | Aspheric | 199.3766 | 0.5716 | 1.54 | 55.9 | −1.37 | 16.6555 |
| S10 | Aspheric | 0.8792 | 0.4510 | | | | −1.0000 |
| S11 | | Infinite | 0.2100 | 1.52 | 64.2 | | |
| S12 | | Infinite | 0.3753 | | | | |
| S13 | | Infinite | | | | | |

TABLE 6

| Surface number | A4 | A6 | A8 | A10 | A12 |
|---|---|---|---|---|---|
| S1 | −6.9589E−03 | −3.4413E−01 | 1.4064E+00 | −1.1206E+01 | 4.8668E+01 |
| S2 | −3.0247E−01 | −3.8346E−01 | −5.4342E−01 | 1.7439E+00 | −1.7119E+00 |
| S3 | −1.9953E−01 | 2.0792E+00 | −5.8286E+01 | 8.1819E+02 | −7.5078E+03 |
| S4 | −5.9535E−02 | −1.8148E+00 | 3.2954E+01 | −3.6940E+02 | 2.6729E+03 |
| S5 | −1.2105E−01 | 1.8286E−01 | −1.0813E+00 | 3.7254E+00 | −7.1000E+00 |
| S6 | −1.6302E−01 | 2.3880E−01 | −3.7584E−01 | 4.0855E−01 | 9.0457E−03 |
| S7 | 5.1916E−02 | 6.6778E−01 | −8.7114E+00 | 5.6983E+01 | −2.3491E+02 |
| S8 | 1.1196E+00 | −6.2327E+00 | 2.1570E+01 | −4.8947E+01 | 6.7853E+01 |

TABLE 6-continued

| | | | | | |
|---|---|---|---|---|---|
| S9 | 8.3029E−01 | −5.9918E+00 | 2.2791E+01 | −5.8560E+01 | 1.0645E+02 |
| S10 | −8.1293E−01 | 1.2279E+00 | −1.6653E+00 | 1.8030E+00 | −1.5250E+00 |

| Surface number | A14 | A16 | A18 | A20 |
|---|---|---|---|---|
| S1 | −1.0961E+02 | 9.9233E+01 | 0.0000E+00 | 0.0000E+00 |
| S2 | 0.0000E+00 | 0.0000E+00 | 0.0000E+00 | 0.0000E+00 |
| S3 | 4.6720E+04 | −2.0003E+05 | 5.8907E+05 | −1.1707E+06 |
| S4 | −1.3125E+04 | 4.4760E+04 | −1.0614E+05 | 1.7167E+05 |
| S5 | 7.1123E+00 | −2.8950E+00 | −1.2429E+00 | 1.4022E+00 |
| S6 | −7.2085E−01 | 8.9040E−01 | −4.4770E−01 | 8.4144E−02 |
| S7 | 6.5771E+02 | −1.2903E+03 | 1.7945E+03 | −1.7620E+03 |
| S8 | −3.7894E+01 | −5.0850E+01 | 1.3947E+02 | −1.5661E+02 |
| S9 | −1.4004E+02 | 1.3502E+02 | −9.5870E+01 | 4.9951E+01 |
| S10 | 1.0101E+00 | −5.2573E−01 | 2.1361E−01 | −6.6537E−02 |

Figures 6A, 6B:
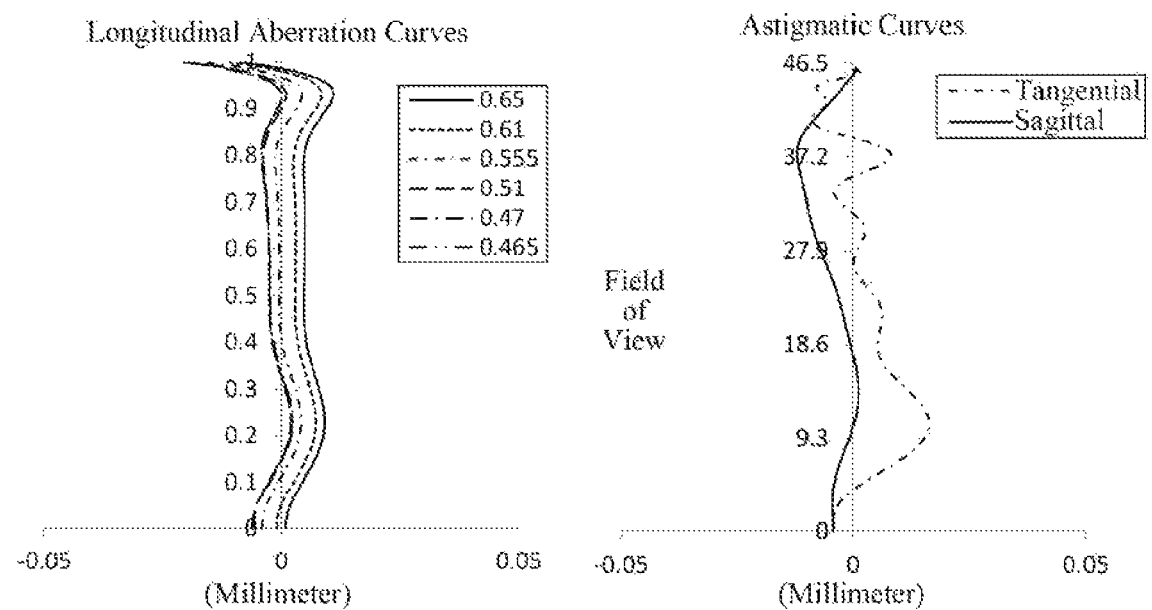
FIGS. 6A to 6D illustrate longitudinal aberration curves, astigmatic curves, a distortion curve, and a lateral color curve of the camera lens group of the example 3, respectively.
Figures 6C, 6D:
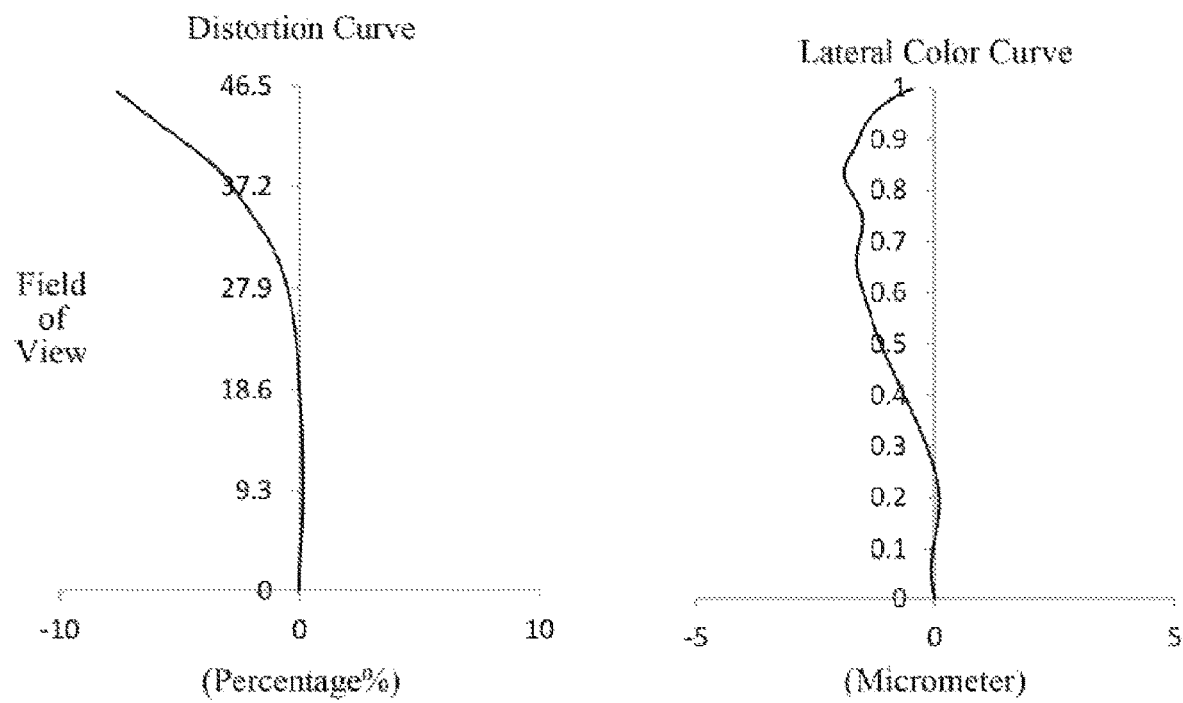

FIG. 6A illustrates the longitudinal aberration curves of the camera lens group according to example 3, representing the deviations of focal points converged by light of different wavelengths after passing through the lens assembly. FIG. 6B illustrates the astigmatic curves of the camera lens group according to example 3, representing the curvatures of a tangential plane and the curvatures of a sagittal plane. FIG. 6C illustrates a distortion curve of the camera lens group according to example 3, representing the amounts of distortion corresponding to different field-of-views. FIG. 6D illustrates a lateral color curve of the camera lens group according to example 3, representing the deviations of different image heights on an imaging plane after light passes through the lens assembly. It can be seen from FIG. 6A to FIG. 6D that the camera lens group provided in example 3 may achieve good image quality.

Example 4

Figure 7:
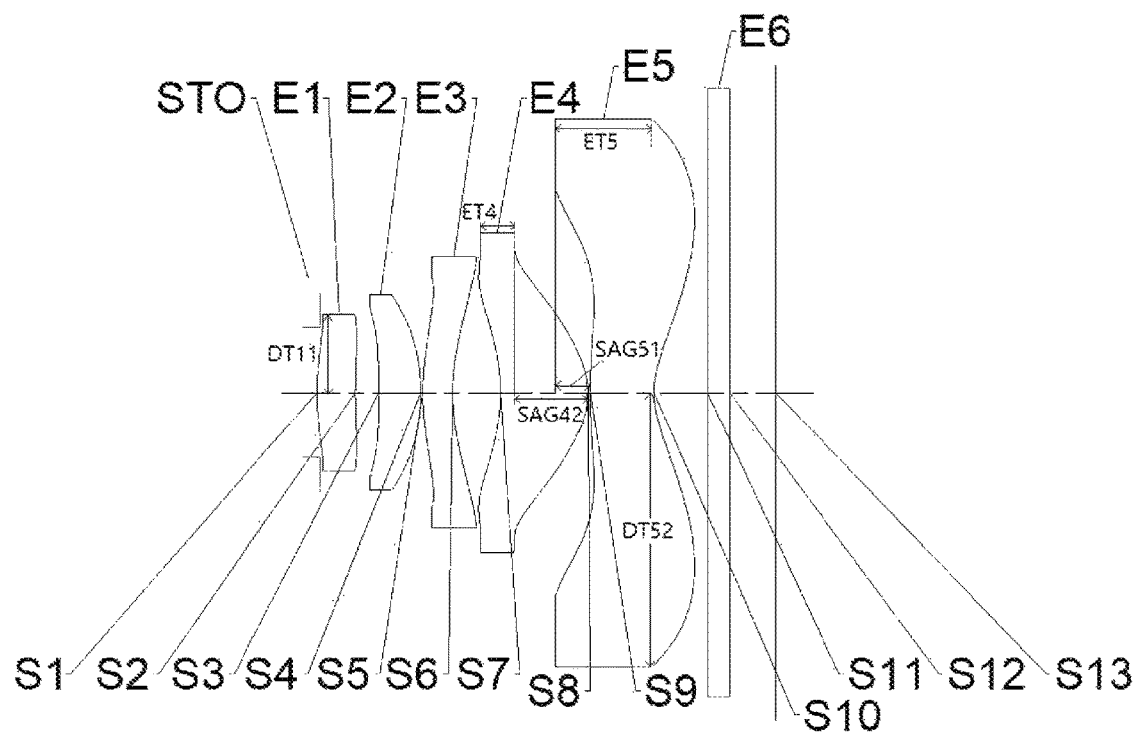
FIG. 7 illustrates a schematic structural view of a camera lens group according to example 4 of the present disclosure.

A camera lens group according to example 4 of the present disclosure is described below with reference to FIG. 7 to FIG. 8D. FIG. 7 shows a schematic structural view of the camera lens group according to example 4 of the present disclosure.

As shown in FIG. 7, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 2.46 mm, a total length TTL of the camera lens group is 3.81 mm, half of a diagonal length ImgH of an effective pixel area on the imaging plane S13 of the camera lens group is 2.73 mm, half of a maximum field-of-view Semi-FOV of the camera lens group is 51.1°, and an aperture value Fno of the camera lens group is 2.24.

Table 7 is a table illustrating basic parameters of the camera lens group of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | | Infinite | Infinite | | | | |
| STO | | Infinite | −0.0260 | | | | |
| S1 | Aspheric | 2.1974 | 0.3500 | 1.55 | 56.1 | 7.89 | −12.0654 |
| S2 | Aspheric | 4.2331 | 0.1211 | | | | 42.0591 |
| S3 | Aspheric | −6.5875 | 0.3280 | 1.67 | 20.4 | 2.78 | −98.8357 |
| S4 | Aspheric | −1.2555 | 0.0200 | | | | −5.0689 |
| S5 | Aspheric | 2.5462 | 0.2736 | 1.55 | 56.1 | −4.75 | −18.0552 |
| S6 | Aspheric | 1.3594 | 0.3727 | | | | −3.7048 |
| S7 | Aspheric | −2.3347 | 0.7874 | 1.55 | 56.1 | 1.48 | −2.2314 |
| S8 | Aspheric | −0.6954 | 0.0200 | | | | −1.4169 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S9 | Aspheric | 3.7394 | 0.4991 | 1.54 | 55.9 | −1.53 | 0.0078 |
| S10 | Aspheric | 0.7378 | 0.4561 | | | | −1.0000 |
| S11 | | Infinite | 0.2100 | 1.52 | 64.2 | | |
| S12 | | Infinite | 0.3718 | | | | |
| S13 | | Infinite | | | | | |

TABLE 8

| Surface number | A4 | A6 | A8 | A10 | A12 |
|---|---|---|---|---|---|
| S1 | −6.3432E−03 | −4.3213E−01 | 1.9655E+00 | −1.8057E+01 | 9.0340E+01 |
| S2 | −3.5096E−01 | −7.7642E−01 | 7.1380E−01 | −8.7087E−01 | 4.2697E−01 |
| S3 | −2.9796E−01 | 3.8303E+00 | −1.1178E+02 | 1.7257E+03 | −1.7266E+04 |
| S4 | −1.2540E−01 | −2.1258E+00 | 4.4840E+01 | −5.4961E+02 | 4.3554E+03 |
| S5 | −1.7291E−01 | 4.6396E−01 | −3.3787E+00 | 1.8338E+01 | −5.7242E+01 |
| S6 | −2.8578E−01 | 8.2478E−01 | −2.6377E+00 | 6.8833E+00 | −1.2214E+01 |
| S7 | −8.7049E−03 | 1.1536E+00 | −1.2630E+01 | 8.3372E+01 | −3.5584E+02 |
| S8 | 7.1945E−01 | −4.4151E+00 | 1.9597E+01 | −6.7995E+01 | 1.8530E+02 |
| S9 | 1.0348E−01 | −3.2262E+00 | 1.4589E+01 | −3.9901E+01 | 7.4239E+01 |
| S10 | −1.2322E+00 | 2.3930E+00 | −4.0264E+00 | 5.2346E+00 | −5.1381E+00 |

| Surface number | A14 | A16 | A18 | A20 |
|---|---|---|---|---|
| S1 | −2.3713E+02 | 2.5152E+02 | 0.0000E+00 | 0.0000E+00 |
| S2 | 0.0000E+00 | 0.0000E+00 | 0.0000E+00 | 0.0000E+00 |
| S3 | 1.1776E+05 | −5.5587E+05 | 1.8152E+06 | −4.0241E+06 |
| S4 | −2.2982E+04 | 8.3001E+04 | −2.0658E+05 | 3.4875E+05 |
| S5 | 1.0531E+02 | −1.1629E+02 | 7.1538E+01 | −1.8858E+01 |
| S6 | 1.3851E+01 | −9.7340E+00 | 3.9240E+00 | −7.0341E−01 |
| S7 | 1.0337E+03 | −2.1030E+03 | 3.0327E+03 | −3.0896E+03 |
| S8 | −3.8856E+02 | 6.0964E+02 | −6.9823E+02 | 5.6994E+02 |
| S9 | −9.8481E+01 | 9.5360E+01 | −6.8044E+01 | 3.5716E+01 |
| S10 | 3.7914E+00 | −2.1000E+00 | 8.6983E−01 | −2.6702E−01 |

Figure 8A:
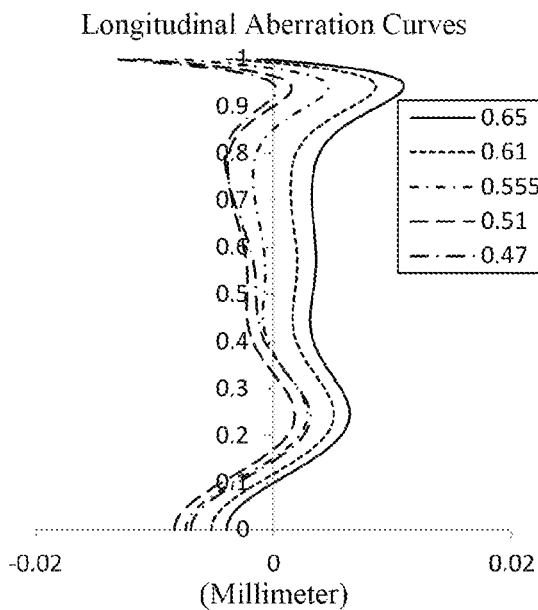
FIGS. 8A to 8D illustrate longitudinal aberration curves, astigmatic curves, a distortion curve, and a lateral color curve of the camera lens group of the example 4, respectively.
Figure 8B:
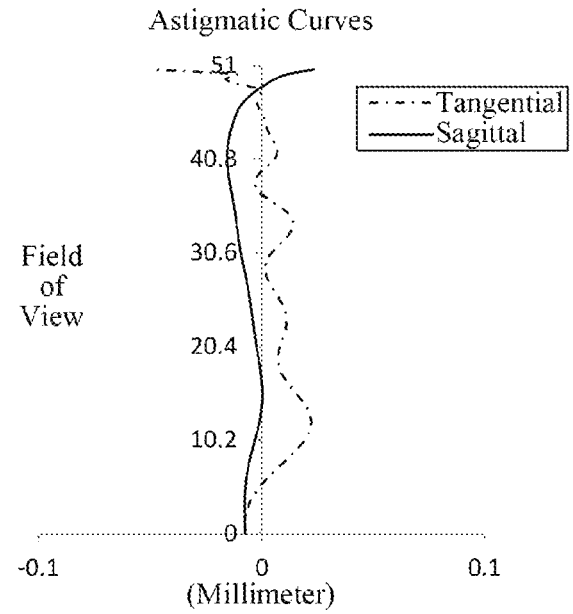
Figure 8C:
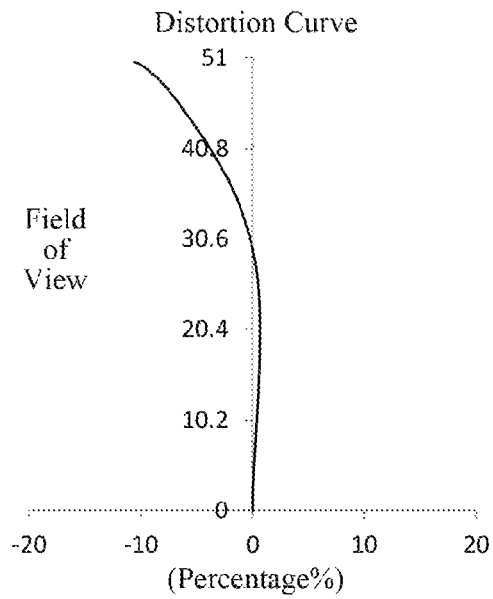
Figure 8D:
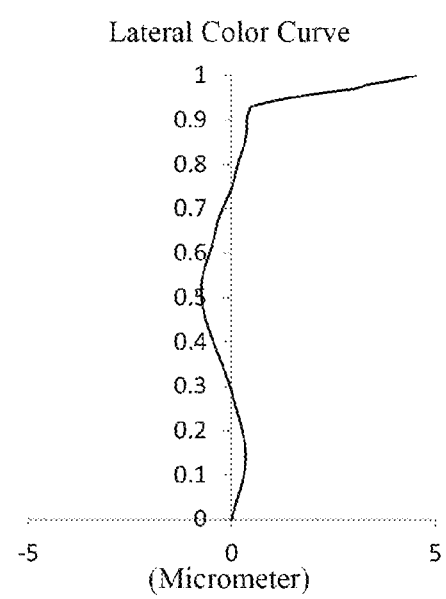

FIG. 8A illustrates the longitudinal aberration curves of the camera lens group according to example 4, representing the deviations of focal points converged by light of different wavelengths after passing through the lens assembly. FIG. 8B illustrates the astigmatic curves of the camera lens group according to example 4, representing the curvatures of a tangential plane and the curvatures of a sagittal plane. FIG. 8C illustrates a distortion curve of the camera lens group according to example 4, representing the amounts of distortion corresponding to different field-of-views. FIG. 8D illustrates a lateral color curve of the camera lens group according to example 4, representing the deviations of different image heights on an imaging plane after light passes through the lens assembly. It can be seen from FIG. 8A to FIG. 8D that the camera lens group provided in example 4 may achieve good image quality.

Example 5

Figure 9:
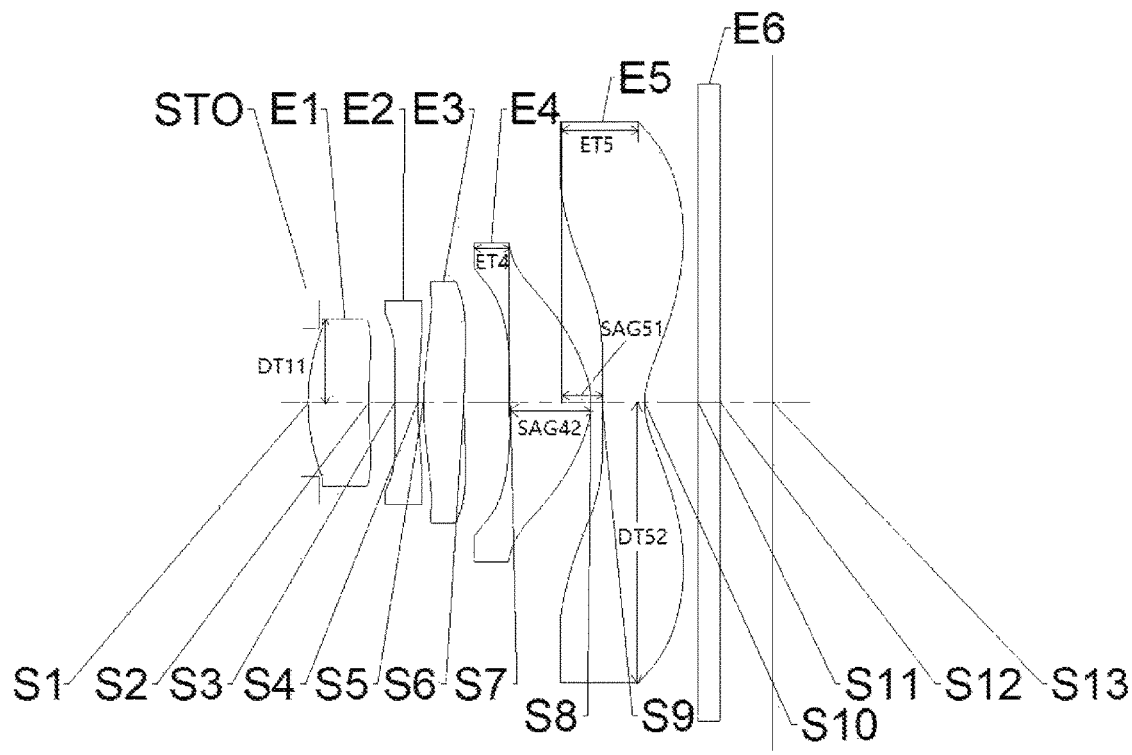
FIG. 9 illustrates a schematic structural view of a camera lens group according to example 5 of the present disclosure.

A camera lens group according to example 5 of the present disclosure is described below with reference to FIG. 9 to FIG. 10D. FIG. 9 shows a schematic structural view of the camera lens group according to example 5 of the present disclosure.

As shown in FIG. 9, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 3.12 mm, a total length TTL of the camera lens group is 4.39 mm, half of a diagonal length ImgH of an effective pixel area on the imaging plane S13 of the camera lens group is 3.00 mm, half of a maximum field-of-view Semi-FOV of the camera lens group is 43.2°, and an aperture value Fno of the camera lens group is 2.33.

Table 9 is a table illustrating basic parameters of the camera lens group of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | | Infinite | Infinite | | | | |
| STO | | Infinite | −0.1118 | | | | |
| S1 | Aspheric | 1.6382 | 0.5429 | 1.55 | 56.1 | 4.54 | −2.0110 |
| S2 | Aspheric | 4.2734 | 0.2729 | | | | −24.3347 |
| S3 | Aspheric | 22.9364 | 0.2277 | 1.67 | 20.4 | −5.84 | 53.1732 |
| S4 | Aspheric | 3.3102 | 0.0504 | | | | −53.1243 |
| S5 | Aspheric | 2.7651 | 0.4190 | 1.55 | 56.1 | 7.63 | −0.2579 |
| S6 | Aspheric | 7.7783 | 0.3761 | | | | −80.3934 |
| S7 | Aspheric | −10.7658 | 0.7902 | 1.55 | 56.1 | 1.38 | 30.8484 |
| S8 | Aspheric | −0.7224 | 0.0996 | | | | −4.9497 |
| S9 | Aspheric | 11.1402 | 0.4007 | 1.54 | 55.9 | −1.30 | 17.2695 |
| S10 | Aspheric | 0.6480 | 0.5051 | | | | −4.7244 |
| S11 | | Infinite | 0.2100 | 1.52 | 64.2 | | |
| S12 | | Infinite | 0.4944 | | | | |
| S13 | | Infinite | | | | | |

TABLE 10

| Surface number | A4 | A6 | A8 | A10 | A12 |
|---|---|---|---|---|---|
| S1 | 5.8210E−02 | −1.2133E−01 | 1.8615E+00 | −1.6409E+01 | 8.2815E+01 |
| S2 | −2.8978E−03 | −3.7810E−01 | 2.6847E+00 | −1.6616E+01 | 6.1740E+01 |
| S3 | −2.1669E−01 | 6.6102E−01 | −5.8092E+00 | 2.6030E+01 | −7.7379E+01 |
| S4 | −1.9807E−01 | 4.9007E−01 | −3.3140E−01 | −3.3607E+00 | 1.3101E+01 |
| S5 | −4.6177E−01 | 9.7275E−01 | −1.1317E+00 | 9.0917E−03 | 2.2830E+00 |
| S6 | −1.4094E−01 | −5.1471E−02 | 4.0703E−01 | −7.0451E−01 | 5.9805E−01 |
| S7 | −2.0486E−02 | −8.3363E−02 | −1.8872E−01 | 6.7468E−01 | −9.9431E−01 |
| S8 | −2.9470E−01 | 6.1506E−01 | −1.3361E+00 | 1.8737E+00 | −1.6596E+00 |
| S9 | −1.0645E−01 | −2.1300E−01 | 3.4154E−01 | −1.8433E−01 | −9.3797E−04 |
| S10 | −1.0963E−01 | 2.8183E−02 | 2.5745E−02 | −3.1543E−02 | 1.5572E−02 |

| Surface number | A14 | A16 | A18 | A20 |
|---|---|---|---|---|
| S1 | −2.4954E+02 | 4.4218E+02 | −4.2546E+02 | 1.7156E+02 |
| S2 | −1.4399E+02 | 2.0429E+02 | −1.6159E+02 | 5.4989E+01 |
| S3 | 1.4874E+02 | −1.7935E+02 | 1.2404E+02 | −3.7011E+01 |
| S4 | −2.3571E+01 | 2.3725E+01 | −1.2794E+01 | 2.8942E+00 |
| S5 | −3.8650E+00 | 3.1857E+00 | −1.3714E+00 | 2.4728E−01 |
| S6 | −2.7593E−01 | 9.4117E−02 | −5.0913E−02 | 1.7741E−02 |
| S7 | 9.3449E−01 | −5.9237E−01 | 2.2262E−01 | −3.5727E−02 |
| S8 | 9.3945E−01 | −3.2547E−01 | 6.2288E−02 | −5.0271E−03 |
| S9 | 5.8784E−02 | −3.7555E−02 | 1.2537E−02 | −2.5383E−03 |
| S10 | −3.9964E−03 | 3.7302E−04 | 7.8562E−05 | −3.0105E−05 |

Figures 10A, 10B:
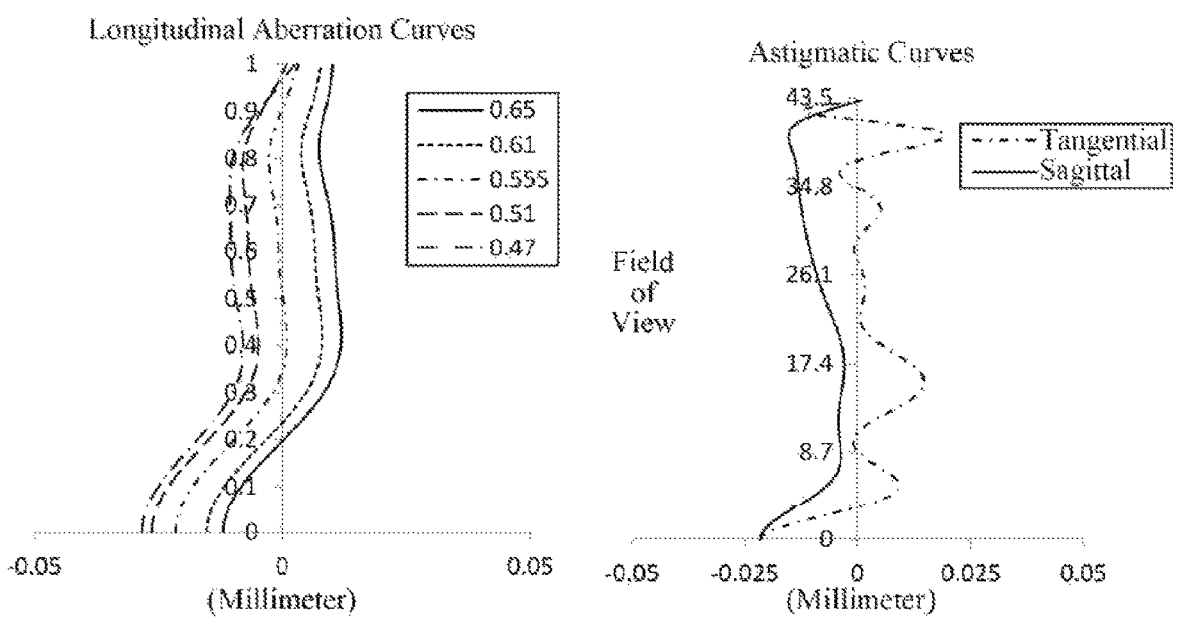
FIGS. 10A to 10D illustrate longitudinal aberration curves, astigmatic curves, a distortion curve, and a lateral color curve of the camera lens group of the example 5, respectively.
Figures 10C, 10D:
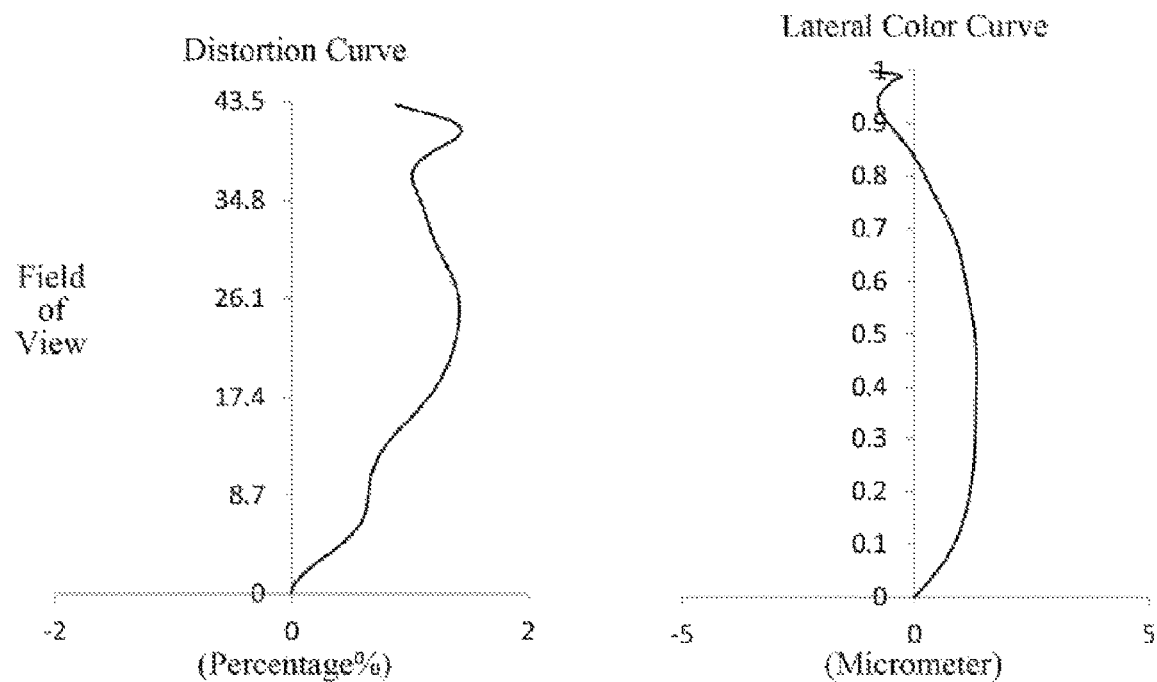

FIG. 10A illustrates the longitudinal aberration curves of the camera lens group according to example 5, representing the deviations of focal points converged by light of different wavelengths after passing through the lens assembly. FIG. 10B illustrates the astigmatic curves of the camera lens group according to example 5, representing the curvatures of a tangential plane and the curvatures of a sagittal plane. FIG. 10C illustrates a distortion curve of the camera lens group according to example 5, representing the amounts of distortion corresponding to different field-of-views. FIG. 10D illustrates a lateral color curve of the camera lens group according to example 5, representing the deviations of different image heights on an imaging plane after light passes through the lens assembly. It can be seen from FIG. 10A to FIG. 10D that the camera lens group provided in example 5 may achieve good image quality.

Example 6

Figure 11:
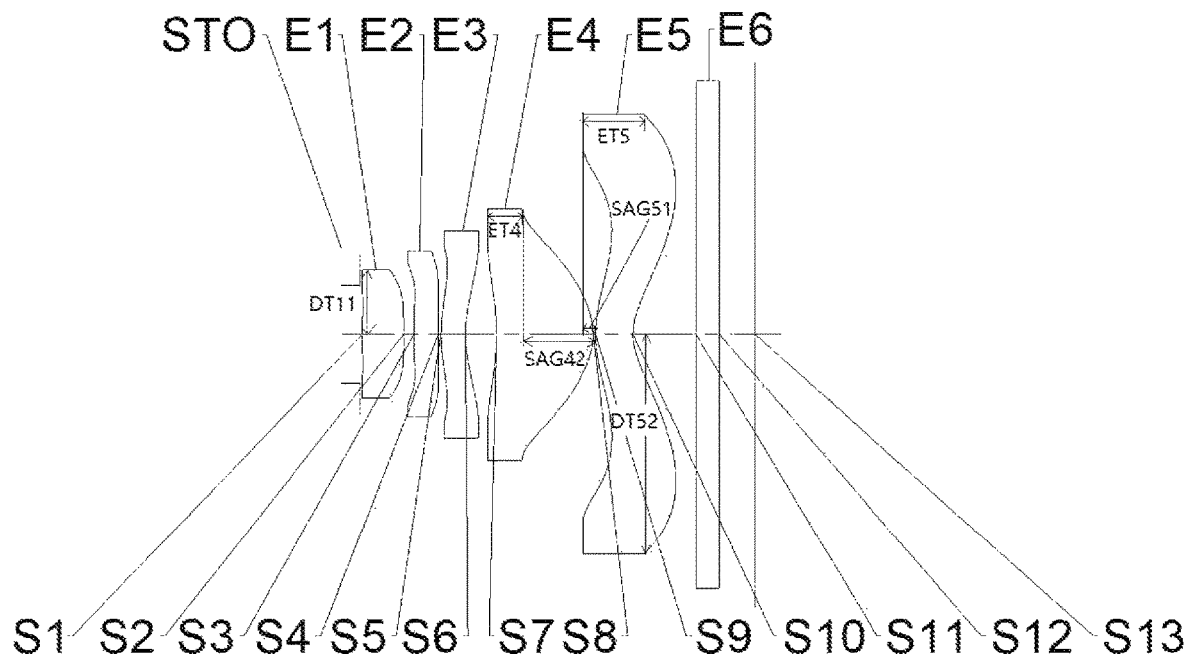
FIG. 11 illustrates a schematic structural view of a camera lens group according to example 6 of the present disclosure.

A camera lens group according to example 6 of the present disclosure is described below with reference to FIG. 11 to FIG. 12D. FIG. 11 shows a schematic structural view of the camera lens group according to example 6 of the present disclosure.

As shown in FIG. 11, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is convex. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 2.01 mm, a total length TTL of the camera lens group is 3.52 mm, half of a diagonal length ImgH of an effective pixel area on the imaging plane S13 of the camera lens group is 2.45 mm, half of a maximum field-of-view Semi-FOV of the camera lens group is 55.6°, and an aperture value Fno of the camera lens group is 2.29.

Table 11 is a table illustrating basic parameters of the camera lens group of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

Figure 12A:
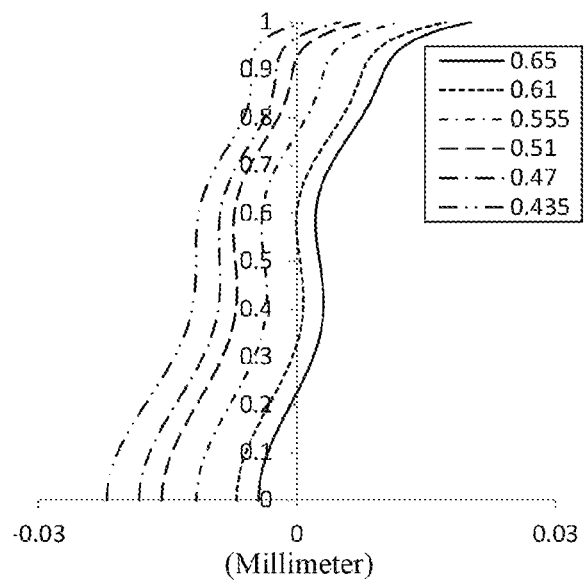
FIGS. 12A to 12D illustrate longitudinal aberration curves, astigmatic curves, a distortion curve, and a lateral color curve of the camera lens group of the example 6, respectively.
Figure 12B:
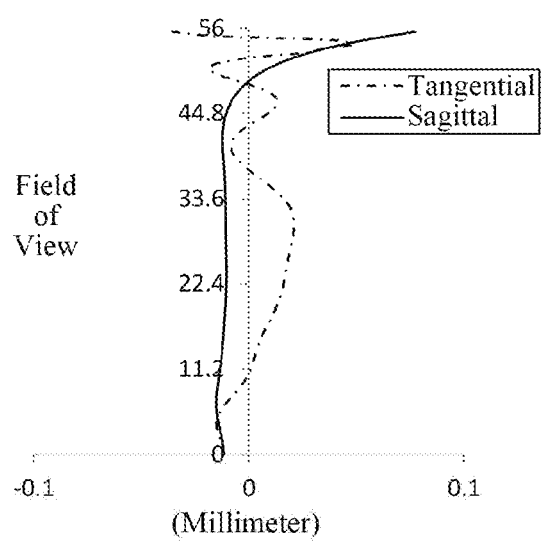
Figure 12C:
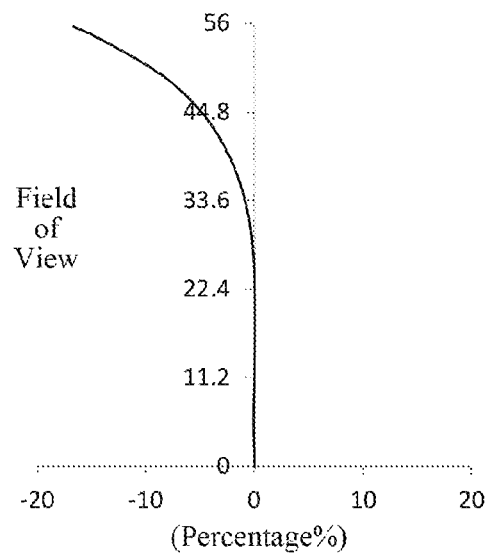
Figure 12D:
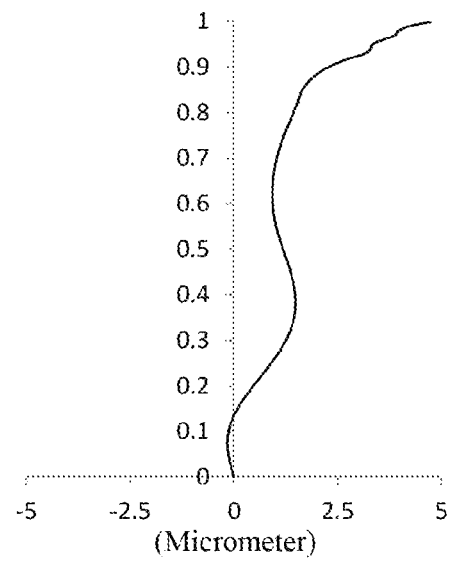

FIG. 12A illustrates the longitudinal aberration curves of the camera lens group according to example 6, representing the deviations of focal points converged by light of different wavelengths after passing through the lens assembly. FIG. 12B illustrates the astigmatic curves of the camera lens group according to example 6, representing the curvatures of a tangential plane and the curvatures of a sagittal plane. FIG. 12C illustrates a distortion curve of the camera lens group according to example 6, representing the amounts of distortion corresponding to different field-of-views. FIG. 12D illustrates a lateral color curve of the camera lens group according to example 6, representing the deviations of different image heights on an imaging plane after light passes through the lens assembly. It can be seen from FIG. 12A to FIG. 12D that the camera lens group provided in example 6 may achieve good image quality.

TABLE 11

| Surface number | Surface type | Radius of curvature | Thickness/Distance | Material Refractive index | Abbe number | Focal length | Conic coefficient |
|---|---|---|---|---|---|---|---|
| OBJ | | Infinite | Infinite | | | | |
| STO | | Infinite | 0.0140 | | | | |
| S1 | Aspheric | 7.4724 | 0.3700 | 1.55 | 56.1 | 10.06 | −93.1121 |
| S2 | Aspheric | −20.3821 | 0.0929 | | | | 15.2584 |
| S3 | Aspheric | 5.3472 | 0.2200 | 1.55 | 56.1 | 4.49 | −88.8751 |
| S4 | Aspheric | −4.4514 | 0.0200 | | | | 18.4831 |
| S5 | Aspheric | 1.4054 | 0.2200 | 1.68 | 19.2 | −10.23 | −4.1750 |
| S6 | Aspheric | 1.0945 | 0.2796 | | | | −7.0648 |
| S7 | Aspheric | −1.9610 | 0.8700 | 1.55 | 56.1 | 1.26 | 2.1991 |
| S8 | Aspheric | −0.5874 | 0.0200 | | | | −2.2799 |
| S9 | Aspheric | 1.1700 | 0.3362 | 1.67 | 20.4 | −1.74 | −0.9812 |
| S10 | Aspheric | 0.5146 | 0.5621 | | | | −3.9158 |
| S11 | | Infinite | 0.2100 | 1.52 | 64.2 | | |
| S12 | | Infinite | 0.3201 | | | | |
| S13 | | Infinite | | | | | |

TABLE 12

| Surface number | A4 | A6 | A8 | A10 | A12 |
|---|---|---|---|---|---|
| S1 | −2.8904E−01 | −4.4901E−01 | −8.5335E−01 | 0.0000E+00 | 0.0000E+00 |
| S2 | −6.0827E−01 | −6.1879E+00 | 3.6238E+01 | −1.3444E+02 | 2.9808E+02 |
| S3 | 7.7330E−01 | −9.2915E+00 | 3.4858E+01 | −1.7485E+02 | 8.8433E+02 |
| S4 | 1.2842E+00 | −4.8828E+00 | 2.5233E+00 | 4.5380E+01 | −2.2841E+02 |
| S5 | −5.9668E−01 | 3.7938E−01 | −1.1803E+00 | 1.8597E+01 | −7.4162E+01 |
| S6 | −3.7506E−01 | 8.7600E−01 | −3.1807E+00 | 1.0209E+01 | −1.7050E+01 |
| S7 | 3.2754E−01 | 1.1116E−01 | −2.1480E+00 | 8.6864E+00 | −1.9051E+01 |
| S8 | 2.1394E−01 | −2.1122E+00 | 7.6183E+00 | −1.8004E+01 | 2.8520E+01 |
| S9 | −4.9607E−01 | 4.7131E−01 | −5.6712E−01 | 5.5573E−01 | −3.7986E−01 |
| S10 | −1.2791E−01 | 3.8482E−02 | 5.5971E−03 | −1.9139E−02 | 1.4684E−02 |

| Surface number | A14 | A16 | A18 | A20 |
|---|---|---|---|---|
| S1 | 0.0000E+00 | 0.0000E+00 | 0.0000E+00 | 0.0000E+00 |
| S2 | −2.6757E+02 | 0.0000E+00 | 0.0000E+00 | 0.0000E+00 |
| S3 | −3.1750E+03 | 7.4030E+03 | −9.6689E+03 | 5.2245E+03 |
| S4 | 5.7289E+02 | −8.9045E+02 | 8.5247E+02 | −3.7334E+02 |
| S5 | 1.2739E+02 | −1.2178E+02 | 8.3177E+01 | −3.3925E+01 |
| S6 | 6.9388E+00 | 1.6477E+01 | −2.2332E+01 | 8.3082E+00 |
| S7 | 2.6371E+01 | −2.3194E+01 | 1.1872E+01 | −2.6905E+00 |
| S8 | −2.9527E+01 | 1.9162E+01 | −7.0252E+00 | 1.1009E+00 |
| S9 | 1.7270E−01 | −5.0185E−02 | 8.5256E−03 | −6.4564E−04 |
| S10 | −6.5545E−03 | 1.7622E−03 | −2.6277E−04 | 1.6652E−05 |

Example 7

Figure 13:
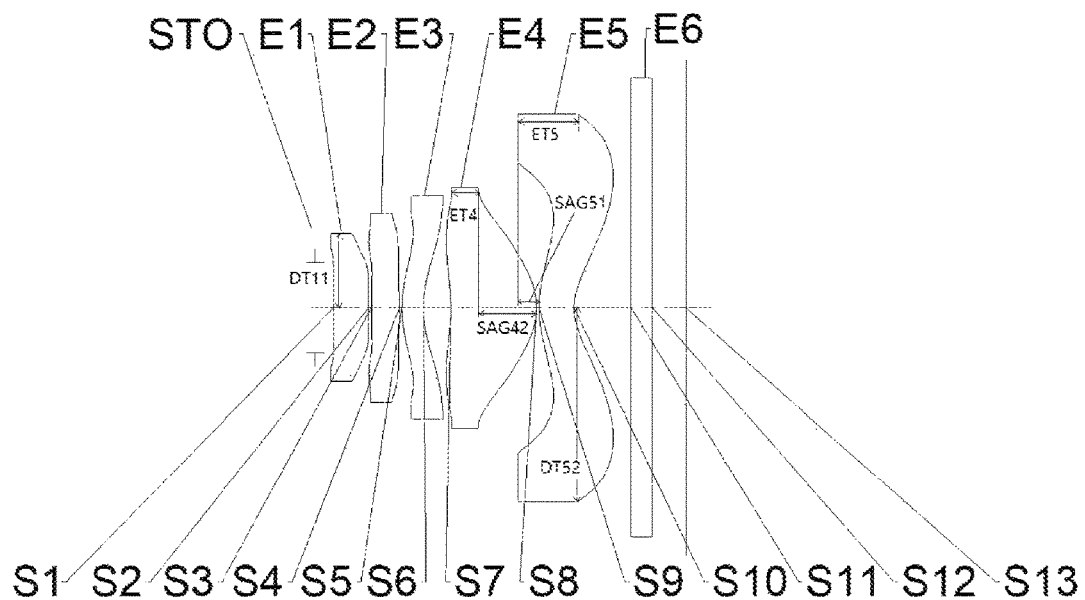
FIG. 13 illustrates a schematic structural view of a camera lens group according to example 7 of the present disclosure.

A camera lens group according to example 7 of the present disclosure is described below with reference to FIG. 13 to FIG. 14D. FIG. 13 shows a schematic structural view of the camera lens group according to example 7 of the present disclosure.

As shown in FIG. 13, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 2.02 mm, a total length TTL of the camera lens group is 3.47 mm, half of a diagonal length ImgH of an effective pixel area on the imaging plane S13 of the camera lens group is 2.30 mm, half of a maximum field-of-view Semi-FOV of the camera lens group is 52.5°, and an aperture value Fno of the camera lens group is 2.28.

Table 13 is a table illustrating basic parameters of the camera lens group of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Refractive index | Abbe number | Focal length | Conic coefficient |
|---|---|---|---|---|---|---|---|
| OBJ | | Infinite | Infinite | | | | |
| STO | | Infinite | 0.1800 | | | | |
| S1 | Aspheric | 6.2242 | 0.3453 | 1.55 | 56.1 | 35.78 | −39.9156 |
| S2 | Aspheric | 8.9564 | 0.0260 | | | | 93.9210 |
| S3 | Aspheric | 18.5694 | 0.2763 | 1.55 | 56.1 | 3.89 | −99.0022 |
| S4 | Aspheric | −2.3866 | 0.0250 | | | | 3.6238 |
| S5 | Aspheric | 1.2140 | 0.2100 | 1.68 | 19.2 | −58.01 | −1.3973 |
| S6 | Aspheric | 1.0954 | 0.2718 | | | | −3.9401 |
| S7 | Aspheric | −1.9105 | 0.8500 | 1.55 | 56.1 | 1.49 | 1.5974 |
| S8 | Aspheric | −0.6607 | 0.0220 | | | | −2.7504 |
| S9 | Aspheric | 1.0956 | 0.3463 | 1.68 | 19.2 | −2.02 | −0.5753 |
| S10 | Aspheric | 0.5308 | 0.5623 | | | | −3.8590 |
| S11 | | Infinite | 0.2100 | 1.52 | 64.2 | | |
| S12 | | Infinite | 0.3282 | | | | |
| S13 | | Infinite | | | | | |

TABLE 14

| Surface number | A4 | A6 | A8 | A10 | A12 |
|---|---|---|---|---|---|
| S1 | −5.8978E−01 | 7.0649E+00 | −1.1905E+02 | 1.1974E+03 | −7.7432E+03 |
| S2 | 7.0895E−02 | −4.4775E+00 | −9.1856E+01 | 9.4416E+02 | −4.1818E+03 |
| S3 | 1.3333E+00 | −6.1182E+00 | −6.6335E+01 | 5.7812E+02 | −1.9516E+03 |
| S4 | 9.1592E−01 | 2.2162E+00 | −3.2969E+01 | 1.4496E+02 | −3.6874E+02 |
| S5 | −3.0573E−01 | 1.9898E−02 | −5.6401E+00 | 3.4206E+01 | −8.9544E+01 |
| S6 | −1.1511E−01 | 3.6840E−01 | −5.1326E+00 | 2.1454E+01 | −4.5541E+01 |
| S7 | 4.0875E−01 | 5.4593E−01 | −1.9558E+00 | 7.1719E−01 | 5.3320E+00 |
| S8 | −2.0127E−01 | 3.8874E−01 | −9.3632E−01 | 1.8899E+00 | −2.0990E+00 |
| S9 | −7.4893E−01 | 1.4759E+00 | −3.4879E+00 | 5.7580E+00 | −6.2984E+00 |
| S10 | −7.7496E−02 | −9.9233E−02 | 2.2714E−01 | −2.4454E−01 | 1.5683E−01 |

| Surface number | A14 | A16 | A18 | A20 |
|---|---|---|---|---|
| S1 | 3.1914E+04 | −7.9937E+04 | 1.0997E+05 | −6.3524E+04 |
| S2 | 1.0890E+04 | −1.7168E+04 | 1.5014E+04 | −5.5431E+03 |
| S3 | 3.6218E+03 | −3.9124E+03 | 2.3188E+03 | −5.8476E+02 |
| S4 | 5.8220E+02 | −5.5716E+02 | 2.9436E+02 | −6.5528E+01 |
| S5 | 1.2482E+02 | −9.6622E+01 | 3.9434E+01 | −6.6662E+00 |
| S6 | 5.5767E+01 | −4.0103E+01 | 1.5844E+01 | −2.6704E+00 |
| S7 | −1.0729E+01 | 9.2828E+00 | −3.9431E+00 | 6.7156E−01 |
| S8 | 8.9824E−01 | 3.4943E−01 | −4.5410E−01 | 1.1534E−01 |
| S9 | 4.4165E+00 | −1.8961E+00 | 4.5111E−01 | −4.5324E−02 |
| S10 | −6.1838E−02 | 1.4651E−02 | −1.9162E−03 | 1.0652E−04 |

Figure 14A:
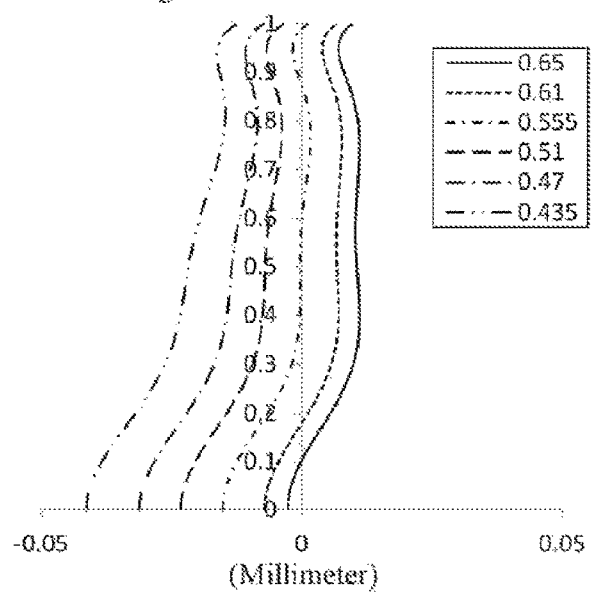
Figure 14B:
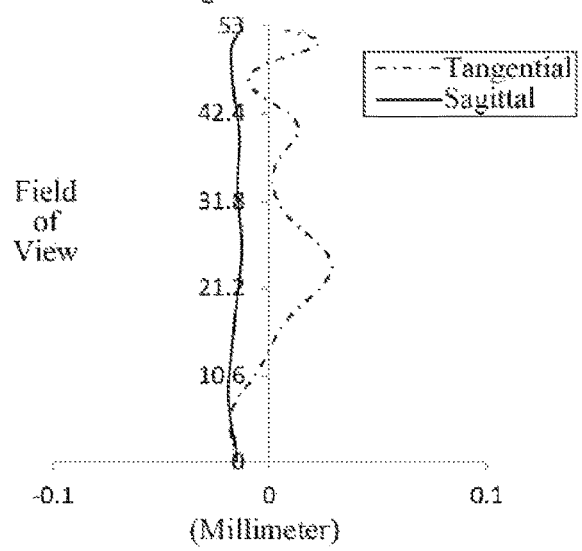

FIG. 14A illustrates the longitudinal aberration curves of the camera lens group according to example 7, representing deviations of focal points converged by light of different wavelengths after passing through the lens assembly. FIG. 14B illustrates the astigmatic curves of the camera lens group according to example 7, representing the curvatures of a tangential plane and the curvatures of a sagittal plane. FIG. 14C illustrates a distortion curve of the camera lens group according to example 7, representing the amounts of distortion corresponding to different field-of-views. FIG. 14D illustrates a lateral color curve of the camera lens group according to example 7, representing the deviations of different image heights on an imaging plane after light passes through the lens assembly. It can be seen from FIG. 14A to FIG. 14D that the camera lens group provided in example 7 may achieve good image quality.

Example 8

A camera lens group according to example 8 of the present disclosure is described below with reference to FIG. 15 to FIG. 16D. FIG. 15 shows a schematic structural view of the camera lens group according to example 8 of the present disclosure.

As shown in FIG. 15, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is convex. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 2.02 mm, a total length TTL of the camera lens group is 3.26 mm, half of a diagonal length ImgH of an effective pixel area on the imaging plane S13 of the camera lens group is 2.40 mm, half of a maximum field-of-view Semi-FOV of the camera lens group is 55.0°, and an aperture value Fno of the camera lens group is 2.50.

Table 15 is a table illustrating basic parameters of the camera lens group of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | | Infinite | Infinite | | | | |
| STO | | Infinite | −0.0117 | | | | |
| S1 | Aspheric | 2.4343 | 0.2809 | 1.55 | 56.1 | 4.45 | −10.8985 |
| S2 | Aspheric | −1553.3333 | 0.1149 | | | | 90.0000 |
| S3 | Aspheric | −2.3967 | 0.2589 | 1.55 | 56.1 | 6.85 | −24.4495 |
| S4 | Aspheric | −1.5166 | 0.0300 | | | | −6.7595 |
| S5 | Aspheric | 1.7930 | 0.2150 | 1.68 | 19.2 | −42.21 | −10.3924 |
| S6 | Aspheric | 1.6055 | 0.2728 | | | | −2.1154 |
| S7 | Aspheric | −1.2870 | 0.6689 | 1.55 | 56.1 | 1.37 | −10.1716 |
| S8 | Aspheric | −0.5610 | 0.0300 | | | | −1.6027 |
| S9 | Aspheric | 1.1733 | 0.3280 | 1.62 | 23.5 | −1.62 | −0.9053 |
| S10 | Aspheric | 0.4913 | 0.4517 | | | | −4.2948 |
| S11 | | Infinite | 0.2100 | 1.52 | 64.2 | | |
| S12 | | Infinite | 0.3989 | | | | |
| S13 | | Infinite | | | | | |

TABLE 16

| Surface number | A4 | A6 | A8 | A10 | A12 |
|---|---|---|---|---|---|
| S1 | −2.5286E−01 | 3.1170E+00 | −1.1051E+02 | 2.0221E+03 | −2.3750E+04 |
| S2 | −6.1017E−01 | −1.1571E+00 | −8.1833E+01 | 3.7109E+02 | −5.4323E+03 |
| S3 | −5.0149E−01 | −5.2419E−01 | 7.1213E+00 | 1.1648E+01 | −6.8504E+02 |
| S4 | 2.7536E−01 | −1.1674E+01 | 1.3102E+02 | −8.2080E+02 | 3.3741E+03 |
| S5 | 3.4014E−01 | −7.8168E+00 | 6.0865E+01 | −3.1076E+02 | 1.0772E+03 |
| S6 | 1.5760E−01 | −2.3519E+00 | 8.6479E+00 | −1.9254E+01 | 2.6270E+01 |
| S7 | −1.6758E−01 | 1.3433E+00 | −8.0516E+00 | 4.7254E+01 | −1.8796E+02 |

TABLE 16-continued

| S8 | 7.3165E-01 | -3.8818E+00 | 1.2496E+01 | -3.0344E+01 | 5.8647E+01 |
| S9 | -6.7912E-01 | 1.3025E+00 | -4.0068E+00 | 9.7517E+00 | -1.6604E+01 |
| S10 | -5.7499E-02 | -3.0428E-01 | 8.0661E-01 | -1.2485E+00 | 1.3715E+00 |

| Surface number | A14 | A16 | A18 | A20 |
|---|---|---|---|---|
| S1 | 1.7903E+05 | -8.3729E+05 | 2.2039E+06 | -2.4782E+06 |
| S2 | 4.2784E+04 | -1.8938E+05 | 4.4176E+05 | -4.1722E+05 |
| S3 | 7.2802E+03 | -3.7405E+04 | 9.3082E+04 | -8.8528E+04 |
| S4 | -9.0967E+03 | 1.5224E+04 | -1.4395E+04 | 6.0047E+03 |
| S5 | -2.5089E+03 | 3.7531E+03 | -3.2544E+03 | 1.2360E+03 |
| S6 | -2.0085E+01 | 6.5059E+00 | -2.3320E-02 | -5.3823E-02 |
| S7 | 5.2316E+02 | -1.0352E+03 | 1.4082E+03 | -1.2346E+03 |
| S8 | -9.2910E+01 | 1.2186E+02 | -1.2177E+02 | 8.1604E+01 |
| S9 | 1.9854E+01 | -1.6839E+01 | 1.0150E+01 | -4.3096E+00 |
| S10 | -1.1178E+00 | 6.7980E-01 | -3.0537E-01 | 9.9228E-02 |

Figure 16A:
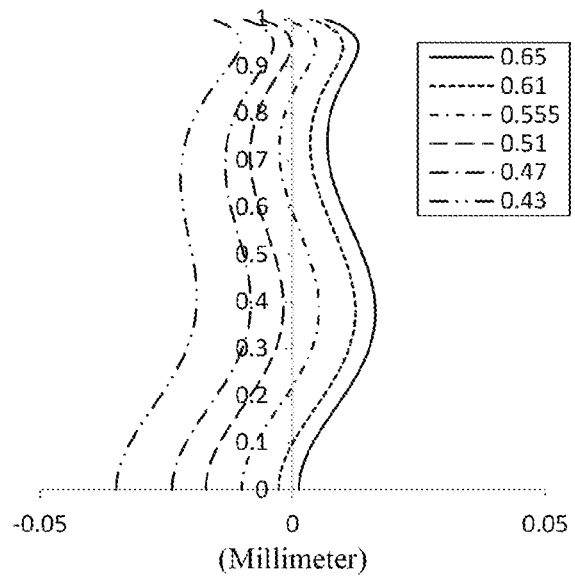
FIGS. 16A to 16D illustrate longitudinal aberration curves, astigmatic curves, a distortion curve, and a lateral color curve of the camera lens group of the example 8, respectively.
Figure 16B:
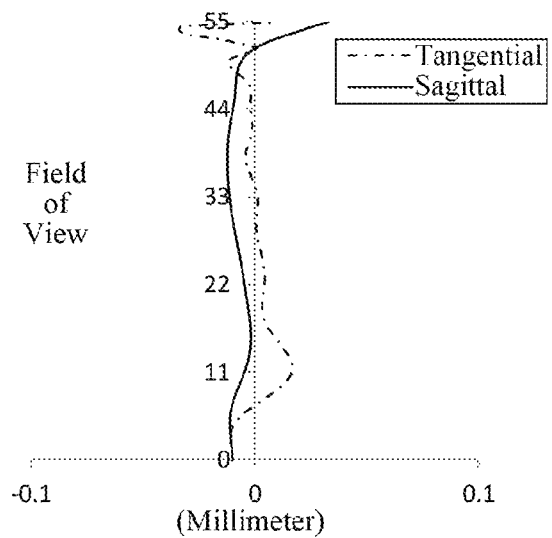
Figure 16C:
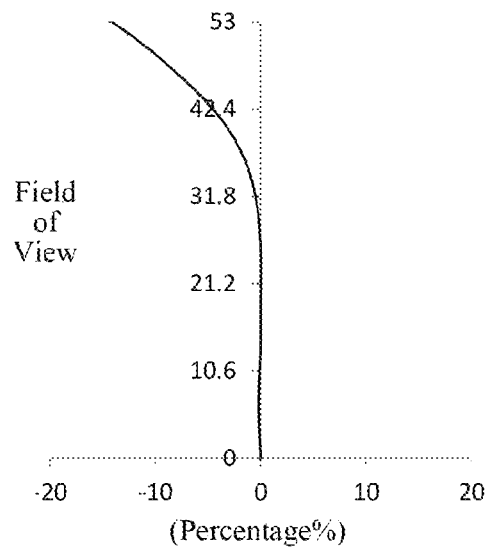
Figure 16D:
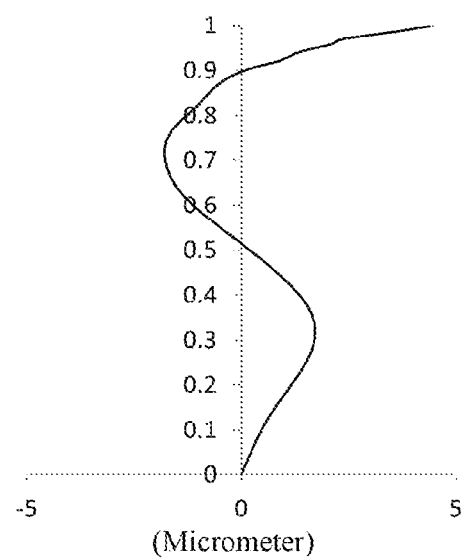

FIG. 16A illustrates the longitudinal aberration curves of the camera lens group according to example 8, representing deviations of focal points converged by light of different wavelengths after passing through the lens assembly. FIG. 16B illustrates the astigmatic curves of the camera lens group according to example 8, representing the curvatures of a tangential plane and the curvatures of a sagittal plane. FIG. 16C illustrates a distortion curve of the camera lens group according to example 8, representing the amounts of distortion corresponding to different field-of-views. FIG. 16D illustrates a lateral color curve of the camera lens group according to example 8, representing the deviations of different image heights on an imaging plane after light passes through the lens assembly. It can be seen from FIG. 16A to FIG. 16D that the camera lens group provided in example 8 may achieve good image quality.

Example 9

Figure 17:
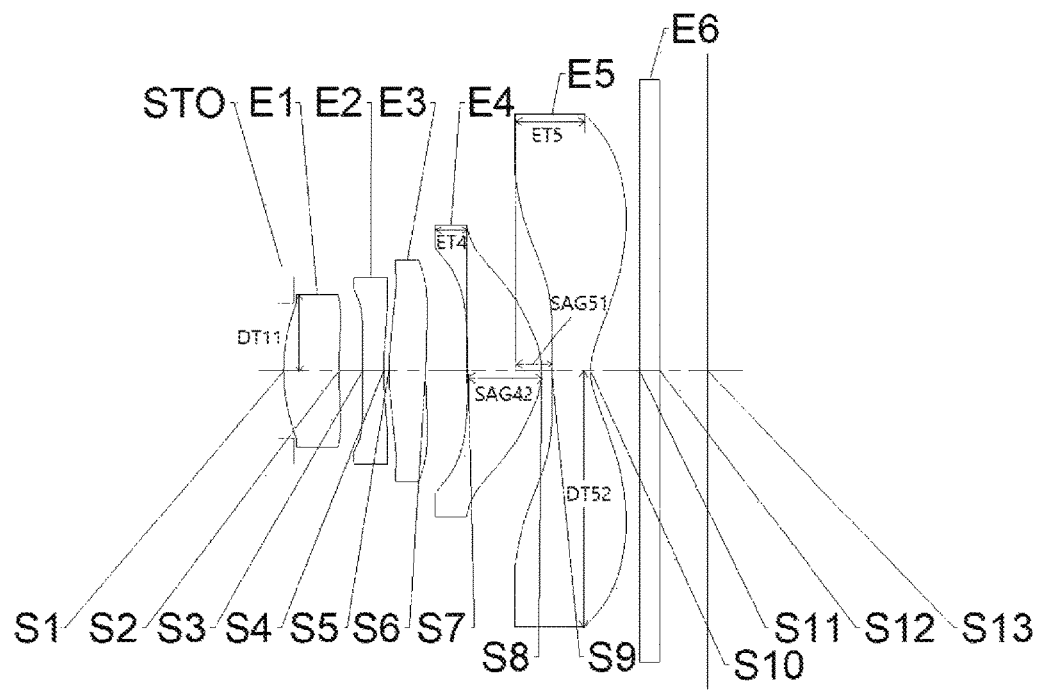
FIG. 17 illustrates a schematic structural view of a camera lens group according to example 9 of the present disclosure.

A camera lens group according to example 9 of the present disclosure is described below with reference to FIG. 17 to FIG. 18D. FIG. 17 shows a schematic structural view of the camera lens group according to example 9 of the present disclosure.

As shown in FIG. 17, the camera lens group includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is concave, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 3.19 mm, a total length TTL of the camera lens group is 4.40 mm, half of a diagonal length ImgH of an effective pixel area on the imaging plane S13 of the camera lens group is 3.14 mm, half of a maximum field-of-view Semi-FOV of the camera lens group is 43.8°, and an aperture value Fno of the camera lens group is 2.24.

Table 17 is a table illustrating basic parameters of the camera lens group of example 9, wherein the units for the radius of curvature, the thickness/distance and the focal length are millimeter (mm). Table 18 shows high-order coefficients applicable to each aspheric surface in example 9, wherein the surface shape of each aspheric surface may be defined by the formula (1) given in the above example 1.

TABLE 17

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | | Infinite | Infinite | | | | |
| STO | | Infinite | -0.1094 | | | | |
| S1 | Aspheric | 1.6826 | 0.5460 | 1.55 | 56.1 | 4.25 | -2.5667 |
| S2 | Aspheric | 5.4064 | 0.2698 | | | | -15.9416 |
| S3 | Aspheric | -13.6268 | 0.2249 | 1.67 | 20.4 | -5.63 | 99.0000 |
| S4 | Aspheric | 5.2019 | 0.1000 | | | | -63.1108 |
| S5 | Aspheric | 3.6991 | 0.3256 | 1.55 | 56.1 | 7.04 | -0.6643 |
| S6 | Aspheric | 93.9505 | 0.5036 | | | | -99.0000 |
| S7 | Aspheric | -4.5769 | 0.6757 | 1.55 | 56.1 | 1.36 | 2.7092 |
| S8 | Aspheric | -0.6713 | 0.1000 | | | | -4.3735 |

TABLE 17-continued

| Surface number | Surface type | Radius of curvature | Thickness/ Distance | Material Refractive index | Abbe number | Focal length | Conic coefficient |
|---|---|---|---|---|---|---|---|
| S9 | Aspheric | 10.7535 | 0.3870 | 1.54 | 55.9 | −1.24 | 12.4168 |
| S10 | Aspheric | 0.6205 | 0.5193 | | | | −5.0126 |
| S11 | | Infinite | 0.2276 | 1.52 | 64.2 | | |
| S12 | | Infinite | 0.5206 | | | | |
| S13 | | Infinite | | | | | |

TABLE 18

| Surface number | A4 | A6 | A8 | A10 | A12 |
|---|---|---|---|---|---|
| S1 | 6.8084E−02 | 7.1022E−02 | −9.4396E−01 | 6.7687E+00 | −3.1966E+01 |
| S2 | −3.3759E−02 | 7.7038E−03 | −9.9214E−01 | 6.1301E+00 | −2.5509E+01 |
| S3 | −2.0093E−01 | 2.1389E−01 | −5.5945E−01 | −4.4035E+00 | 3.0133E+01 |
| S4 | −2.3938E−01 | 7.8670E−01 | −2.1157E+00 | 3.2590E+00 | −2.1523E+00 |
| S5 | −3.3306E−01 | 7.7140E−01 | −1.7405E+00 | 3.5792E+00 | −6.0506E+00 |
| S6 | −1.6684E−01 | 1.0001E−01 | −1.4939E−01 | 4.2064E−01 | −1.0113E+00 |
| S7 | −4.7382E−02 | −1.0232E−01 | 1.8203E−01 | −2.4939E−01 | 4.4051E−02 |
| S8 | −3.0917E−01 | 6.0939E−01 | −1.2672E+00 | 1.8948E+00 | −1.9447E+00 |
| S9 | −1.2445E−01 | 9.0584E−03 | 4.3006E−02 | −3.3466E−02 | 1.3140E−02 |
| S10 | −9.5126E−02 | 4.9955E−02 | −2.0693E−02 | 6.0659E−03 | −1.2690E−03 |

| Surface number | A14 | A16 | A18 | A20 |
|---|---|---|---|---|
| S1 | 9.8158E+01 | −1.8809E+02 | 2.0262E+02 | −9.3404E+01 |
| S2 | 6.3793E+01 | −9.5216E+01 | 7.6771E+01 | −2.5680E+01 |
| S3 | −9.2043E+01 | 1.5524E+02 | −1.4162E+02 | 5.4495E+01 |
| S4 | −1.7367E+00 | 4.7930E+00 | −3.8038E+00 | 1.1035E+00 |
| S5 | 7.3737E+00 | −5.8742E+00 | 2.7262E+00 | −5.6030E−01 |
| S6 | 1.5348E+00 | −1.4263E+00 | 7.4535E−01 | −1.6197E−01 |
| S7 | 3.2655E−01 | −4.1048E−01 | 2.0207E−01 | −3.6626E−02 |
| S8 | 1.3064E+00 | −5.3185E−01 | 1.1771E−01 | −1.0852E−02 |
| S9 | −3.0356E−03 | 4.1396E−04 | −3.0815E−05 | 9.6487E−07 |
| S10 | 1.8356E−04 | −1.7554E−05 | 1.0277E−06 | −2.8615E−08 |

Figures 18A, 18B:
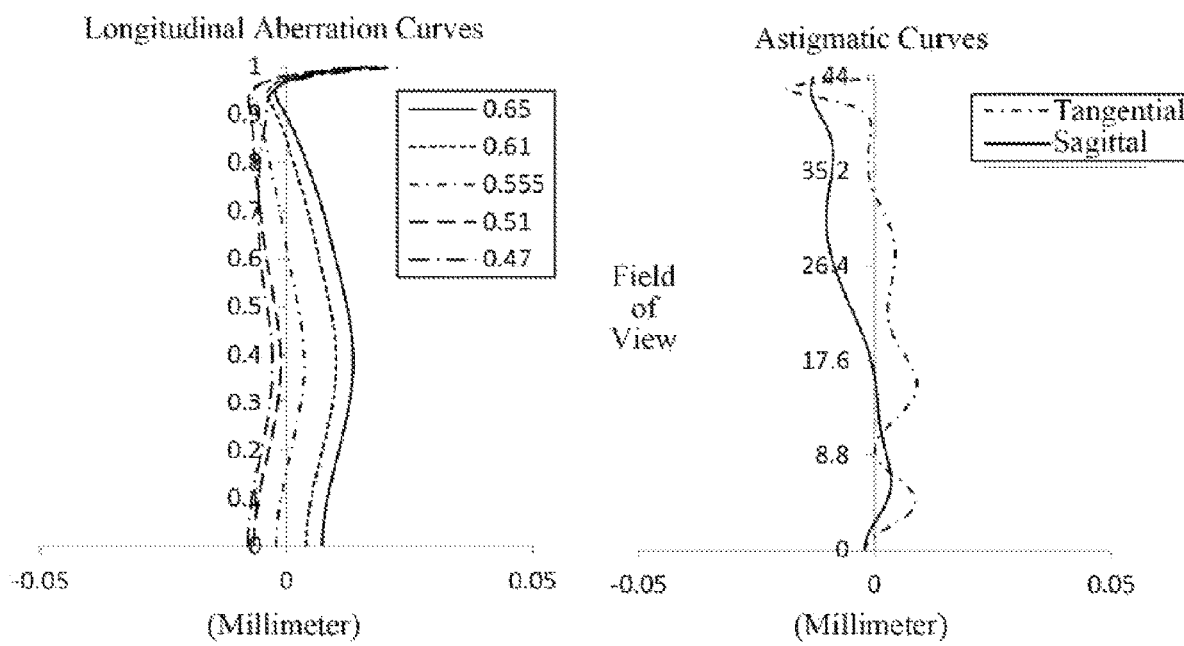
FIGS. 18A to 18D illustrate longitudinal aberration curves, astigmatic curves, a distortion curve, and a lateral color curve of the camera lens group of the example 9, respectively.
Figure 18C:
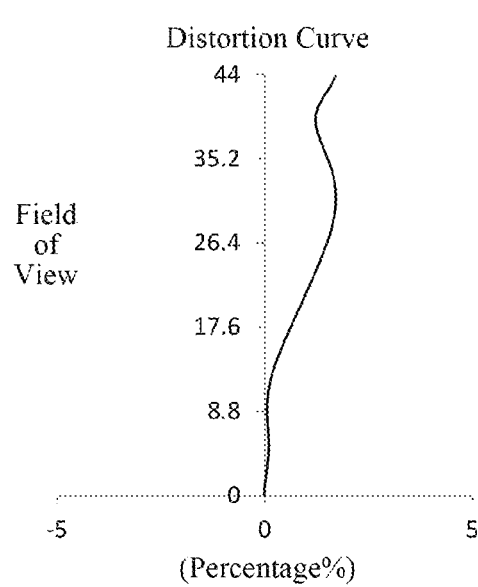
Figure 18D:
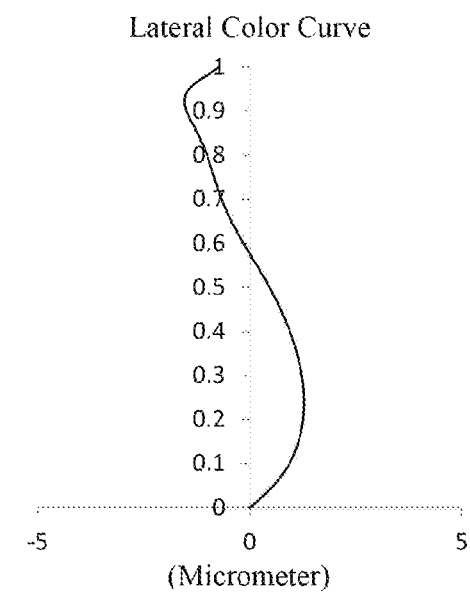

FIG. 18A illustrates the longitudinal aberration curves of the camera lens group according to example 9, representing deviations of focal points converged by light of different wavelengths after passing through the lens assembly. FIG. 18B illustrates the astigmatic curves of the camera lens group according to example 9, representing the curvatures of a tangential plane and the curvatures of a sagittal plane. FIG. 18C illustrates a distortion curve of the camera lens group according to example 9, representing the amounts of distortion corresponding to different field-of-views. FIG. 18D illustrates a lateral color curve of the camera lens group according to example 9, representing the deviations of different image heights on an imaging plane after light passes through the lens assembly. It can be seen from FIG. 18A to FIG. 18D that the camera lens group provided in example 9 may achieve good image quality.

In view of the above, examples 1 to 9 respectively satisfy the relationship shown in Table 19.

TABLE 19

| | Example | | | | | | | | |
|---|---|---|---|---|---|---|---|---|---|
| Condition | 1 | 2 | 3 | 4 | 5 | 6 | 7 | 8 | 9 |
| f*tan$^2$(Semi-FOV) (mm) | 4.14 | 3.36 | 2.87 | 3.79 | 2.75 | 4.27 | 3.43 | 4.12 | 2.93 |
| DT52/DT11 | 4.08 | 3.71 | 3.56 | 3.80 | 3.47 | 4.43 | 3.26 | 4.68 | 3.76 |
| TTL/ImgH | 1.40 | 1.33 | 1.54 | 1.40 | 1.46 | 1.44 | 1.51 | 1.36 | 1.40 |
| f1/R1 | 3.56 | 2.66 | 3.50 | 3.59 | 2.77 | 1.35 | 5.75 | 1.83 | 2.53 |
| R5/R10 | 2.99 | 3.46 | 2.65 | 3.45 | 4.27 | 2.73 | 2.29 | 3.65 | 5.96 |
| CT4/T34 | 1.85 | 1.74 | 1.76 | 2.11 | 2.10 | 3.11 | 3.13 | 2.45 | 1.34 |
| (SAG42 + SAG51)/(SAG42 − SAG51) | 2.76 | 3.01 | 2.82 | 2.68 | 2.74 | 1.40 | 2.14 | 1.45 | 2.12 |
| (ET4 + ET5)/(ET5 − ET4) | 2.03 | 2.55 | 1.85 | 1.96 | 2.10 | 3.46 | 2.58 | 3.12 | 2.32 |
| CT5/CT3 | 2.13 | 1.05 | 2.13 | 1.82 | 0.96 | 1.53 | 1.65 | 1.53 | 1.19 |
| f/f4 | 1.90 | 2.25 | 1.83 | 1.67 | 2.26 | 1.60 | 1.36 | 1.47 | 2.35 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the camera lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, sequentially from an object side to an image side of the camera lens group along an optical axis, comprising:
   a stop;
   a first lens having positive refractive power and a convex object-side surface;
   a second lens having positive refractive power;
   a third lens having negative refractive power, a convex object-side surface and a concave image-side surface;
   a fourth lens having positive refractive power, a concave object-side surface and a convex image-side surface; and
   a fifth lens having negative refractive power, a convex object-side surface and a concave image-side surface,
   wherein 2.00 mm<$\tan^2$(Semi-FOV)*f<5.00 mm, and
   2.12≤(SAG42+SAG51)/(SAG42-SAG51)<3.50,
   where Semi-FOV is half of a maximum field-of-view of the camera lens group, f is a total effective focal length of the camera lens group, SAG42 is a distance measured along the optical axis from an intersection of the image-side surface of the fourth lens and the optical axis to a location projected from a vertex of an effective radius of the image-side surface of the fourth lens on the optical axis, and SAG51 is a distance measured along the optical axis from an intersection of the object-side surface of the fifth lens and the optical axis to a location projected from a vertex of an effective radius of the object-side surface of the fifth lens on the optical axis;
   1.00<f1/R1<6.00,
   where f1 is an effective focal length of the first lens, and R1 is a radius of curvature of the object-side surface of the first lens; and
   1.00<f/f4<3.00,
   where f4 is an effective focal length of the fourth lens.

2. The camera lens group according to claim 1, wherein TTL/ImgH<1.55,
   where TTL is a distance along the optical axis from the object-side surface of the first lens to an imaging plane of the camera lens group, and ImgH is half of a diagonal length of an effective pixel area on the imaging plane of the camera lens group.

3. The camera lens group according to claim 1, wherein 2.00<R5/R10<6.00,
   where R5 is a radius of curvature of the object-side surface of the third lens, and R10 is a radius of curvature of the image-side surface of the fifth lens.

4. The camera lens group according to claim 1, wherein 1.00<CT4/T34<4.00,
   where CT4 is a center thickness of the fourth lens along the optical axis, and T34 is a spaced interval between the third lens and the fourth lens along the optical axis.

5. The camera lens group according to claim 1, wherein 1.00<(ET4+ET5)/(ET5-ET4)<4.00,
   where ET4 is an edge thickness of the fourth lens, and ET5 is an edge thickness of the fifth lens.

6. The camera lens group according to claim 1, wherein 0.50<CT5/CT3<2.50,
   where CT5 is a center thickness of the fifth lens along the optical axis, and CT3 is a center thickness of the third lens along the optical axis.

7. The camera lens group according to claim 1, wherein 3.00<DT52/DT11<3.00,
   where DT11 is a maximum effective radius of the object-side surface of the first lens, and DT52 is a maximum effective radius of the image-side surface of the fifth lens.

8. A camera lens group, sequentially from an object side to an image side of the camera lens group along an optical axis, comprising:
   a stop;
   a first lens having positive refractive power and a convex object-side surface;
   a second lens having positive refractive power;
   a third lens having negative refractive power, a convex object-side surface and a concave image-side surface;
   a fourth lens having positive refractive power, a concave object-side surface and a convex image-side surface; and
   a fifth lens having negative refractive power, a convex object-side surface and a concave image-side surface,
   wherein 2.00 mm<$\tan^2$ (Semi-FOV)*f<5.00 mm, and
   1.00<(ET4+ET5)/(ET5-ET4)<4.00,
   where Semi-FOV is half of a maximum field-of-view of the camera lens group, f is a total effective focal length of the camera lens group, ET4 is an edge thickness of the fourth lens, and ET5 is an edge thickness of the fifth lens;
   1.00<f1/R1<6.00,
   where f1 is an effective focal length of the first lens, and R1 is a radius of curvature of the object-side surface of the first lens; and
   1.00<f/f4<3.00,
   where f4 is an effective focal length of the fourth lens.

9. The camera lens group according to claim 8, wherein 3.00<DT52/DT11<5.00,
   where DT11 is a maximum effective radius of the object-side surface of the first lens, and DT52 is a maximum effective radius of the image-side surface of the fifth lens.

10. The camera lens group according to claim 9, wherein 1.00< (SAG42+SAG51)/(SAG42-SAG51)<3.50,
    where SAG42 is a distance measured along the optical axis from an intersection of the image-side surface of the fourth lens and the optical axis to a location projected from a vertex of an effective radius of the image-side surface of the fourth lens on the optical axis, and SAG51 is a distance measured along the optical axis from an intersection of the object-side surface of the fifth lens and the optical axis to a location projected from a vertex of an effective radius of the object-side surface of the fifth lens on the optical axis.

11. The camera lens group according to claim 8, wherein TTL/ImgH<1.55,
where TTL is a distance along the optical axis from the object-side surface of the first lens to an imaging plane of the camera lens group, and ImgH is half of a diagonal length of an effective pixel area on the imaging plane of the camera lens group.

12. The camera lens group according to claim 8, wherein 2.00<R5/R10<6.00,
where R5 is a radius of curvature of the object-side surface of the third lens, and R10 is a radius of curvature of the image-side surface of the fifth lens.

13. The camera lens group according to claim 8, wherein 1.00<CT4/T34<4.00,
where CT4 is a center thickness of the fourth lens along the optical axis, and T34 is a spaced interval between the third lens and the fourth lens along the optical axis.

14. The camera lens group according to claim 8, wherein 0.50<CT5/CT3<2.50,
where CT5 is a center thickness of the fifth lens along the optical axis, and CT3 is a center thickness of the third lens along the optical axis.

* * * * *